(12) United States Patent
Saint-Germain et al.

(10) Patent No.: US 11,712,975 B2
(45) Date of Patent: Aug. 1, 2023

(54) SYSTEM AND METHOD FOR SECURING, RECHARGING AND OPERATING AN ELECTRIC BICYCLE

(71) Applicant: PBSC Urban Solutions Inc., Longueuil (CA)

(72) Inventors: David Saint-Germain, Montreal (CA); Sébastien Bossan, Boucherville (CA); Daniel Lévesque, Candiac (CA); Mario Bélanger, Montreal (CA); Alain St-Jacques, St-Bruno-de-Montarville (CA)

(73) Assignee: PBSC Urban Solutions Inc.

( * ) Notice: Subject to any disclaimer, the term of this patent is extended or adjusted under 35 U.S.C. 154(b) by 288 days.

(21) Appl. No.: 16/631,117

(22) PCT Filed: Jul. 13, 2018

(86) PCT No.: PCT/CA2018/050855
§ 371 (c)(1),
(2) Date: Jan. 14, 2020

(87) PCT Pub. No.: WO2019/010582
PCT Pub. Date: Jan. 17, 2019

(65) Prior Publication Data
US 2020/0231053 A1  Jul. 23, 2020

Related U.S. Application Data

(60) Provisional application No. 62/532,434, filed on Jul. 14, 2017.

(51) Int. Cl.
*B60L 53/16* (2019.01)
*B60L 53/31* (2019.01)
(Continued)

(52) U.S. Cl.
CPC ............... *B60L 53/16* (2019.02); *B60L 53/12* (2019.02); *B60L 53/31* (2019.02); *B60L 53/62* (2019.02);
(Continued)

(58) Field of Classification Search
CPC .......... B60L 53/16; B60L 53/31; B60L 53/12; B60L 53/62; B60L 53/66; B60L 53/665;
(Continued)

(56) References Cited

U.S. PATENT DOCUMENTS 4,610,496 A * 9/1986 Schwartz ........... H01R 13/6276
439/348
8,061,499 B2  11/2011 Khairallah et al.
(Continued)

FOREIGN PATENT DOCUMENTS

CN       205499235 U     8/2016
DE       102013014029   1/2015
(Continued)

OTHER PUBLICATIONS

PCT International Application No. PCT/CA2018/050855 filed Jul. 13, 2018 in the name of PBSC Urban Solutions Inc., International Search Report and Written Opinion dated Oct. 24, 2018.

*Primary Examiner* — Richard Isla
*Assistant Examiner* — Manuel Hernandez
(74) *Attorney, Agent, or Firm* — Levine Bagade Han LLP

(57) ABSTRACT

A securing system for securing an electric bicycle to a bicycle docking frame includes a female connecting assembly mountable on the bicycle docking frame and a male connecting assembly mountable on the electric bicycle and sized to be received within a tapered recess of the female connecting assembly. When so received, first current coupling elements of the female assembly electrically interface with second current coupling elements of the male assembly, (Continued)

which can allow current flow therebetween to charge a battery of the electric bicycle. A bicycle rack system includes electric bicycles, bicycle docks, a charging module operable to receive electrical power from an external power source and a charging controller for adjusting the level of electrical power provided to dock-side charging modules that charge battery modules of electric bicycles docked thereto. A method for managing charging is also provided. An electric bicycle is operable to receive a user ride profile from an external device and a motor control module thereof is operable to adjust operation of the motor of the electric bicycle based on the user ride profile.

24 Claims, 15 Drawing Sheets

(51) Int. Cl.
    B60L 53/12      (2019.01)
    B60L 53/62      (2019.01)
    B60L 53/66      (2019.01)
    B62H 3/04       (2006.01)
    H01R 13/24      (2006.01)
    H02J 7/00       (2006.01)
    B62H 3/00       (2006.01)
(52) U.S. Cl.
    CPC ............ B60L 53/66 (2019.02); B60L 53/665 (2019.02); B62H 3/04 (2013.01); H01R 13/2478 (2013.01); H01R 13/2485 (2013.01); H02J 7/0013 (2013.01); H02J 7/0042 (2013.01); H02J 7/0045 (2013.01); *B60L 2200/12* (2013.01); *B60L 2270/36* (2013.01); *B62H 2003/005* (2013.01); *H01R 2201/26* (2013.01); *H02J 2310/48* (2020.01)
(58) Field of Classification Search
    CPC ............ B60L 2200/12; B60L 2270/36; H01R 13/2478; H01R 13/2485; H01R 2201/26; B62H 3/04; B62H 2003/005; H02J 7/0013; H02J 7/0042; H02J 7/0045

USPC .................................................. 320/108, 109
    See application file for complete search history.

(56) References Cited

U.S. PATENT DOCUMENTS

| | | | |
|---|---|---|---|
| 9,017,092 B1* | 4/2015 | McCracken | H01R 13/629 439/374 |
| 2008/0053811 A1* | 3/2008 | Balsells | F16B 21/078 200/541 |
| 2008/0297108 A1 | 12/2008 | Le Gars | |
| 2009/0266673 A1 | 10/2009 | Dallaire et al. | |
| 2010/0017045 A1* | 1/2010 | Nesler | B60L 53/11 700/296 |
| 2010/0228405 A1* | 9/2010 | Morgal | B60L 53/68 701/2 |
| 2012/0086396 A1 | 4/2012 | Pan et al. | |
| 2015/0126077 A1* | 5/2015 | van Ekstrom | H01R 13/2421 439/700 |
| 2015/0333457 A1 | 11/2015 | Liu et al. | |
| 2016/0039496 A1 | 2/2016 | Hancock et al. | |
| 2016/0167539 A1* | 6/2016 | Huang | B60L 58/12 320/109 |
| 2017/0005430 A1* | 1/2017 | O'Neill | H01R 24/28 |
| 2017/0166070 A1* | 6/2017 | Dunger | B60L 53/11 |
| 2017/0365959 A1* | 12/2017 | Flechl | H01R 13/635 |
| 2018/0001777 A1* | 1/2018 | Kilic | B60L 53/68 |
| 2019/0127002 A1* | 5/2019 | Bettez | E05B 47/0001 |
| 2021/0249822 A1* | 8/2021 | Pendergrass | H01R 13/11 |

FOREIGN PATENT DOCUMENTS

| | | | |
|---|---|---|---|
| EP | 2955092 | 12/2015 | |
| FR | 2956375 | 8/2011 | |
| JP | 2003118671 | 4/2003 | |
| KR | 101396490 | 5/2014 | |
| WO | WO 1993/008630 | 4/1993 | |
| WO | WO 2010/040703 | 4/2010 | |
| WO | WO 2015/077869 | 6/2015 | |
| WO | WO 2016/136061 | 9/2016 | |
| WO | WO 2017/020134 | 2/2017 | |
| WO | WO-2017020134 A1 * | 2/2017 | ............ B62H 3/00 |

\* cited by examiner

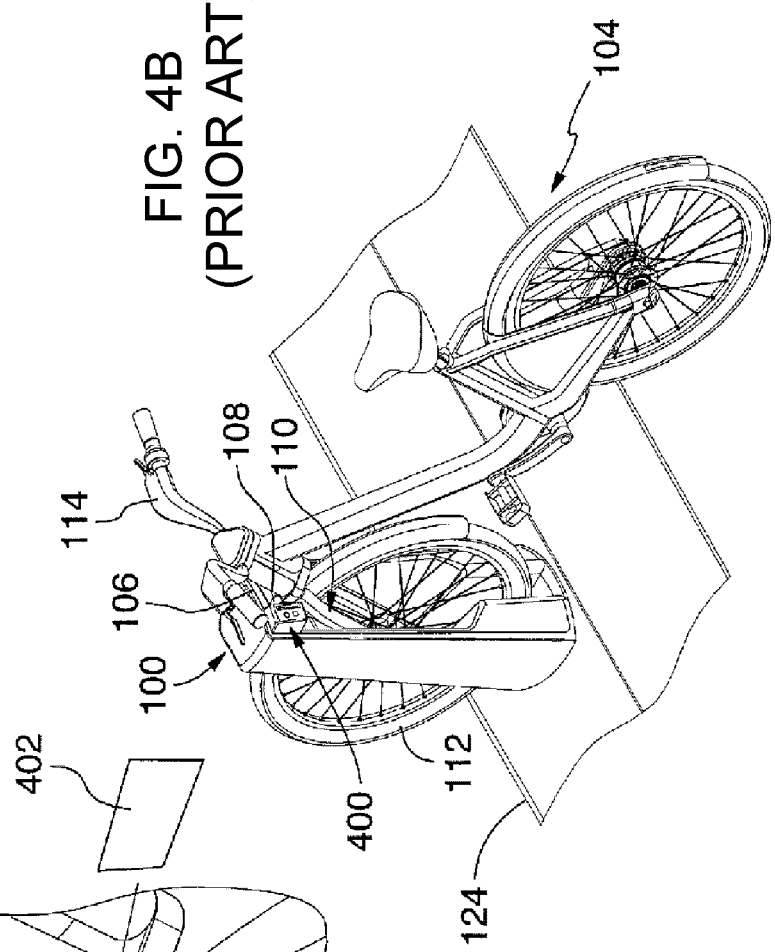
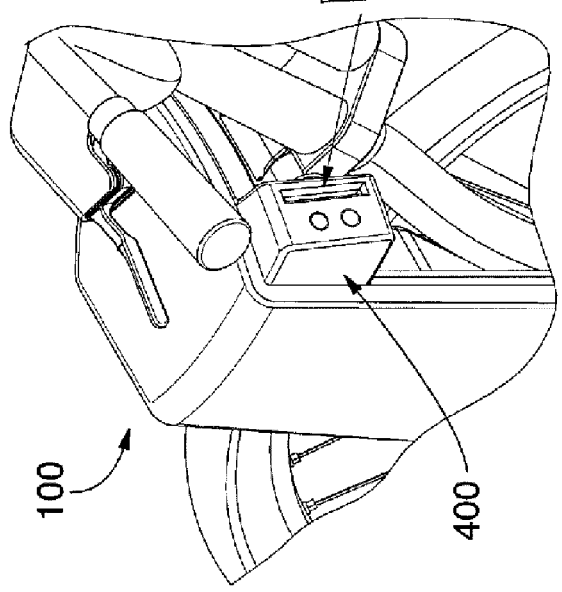
FIG. 4A (PRIOR ART)
FIG. 4B (PRIOR ART)

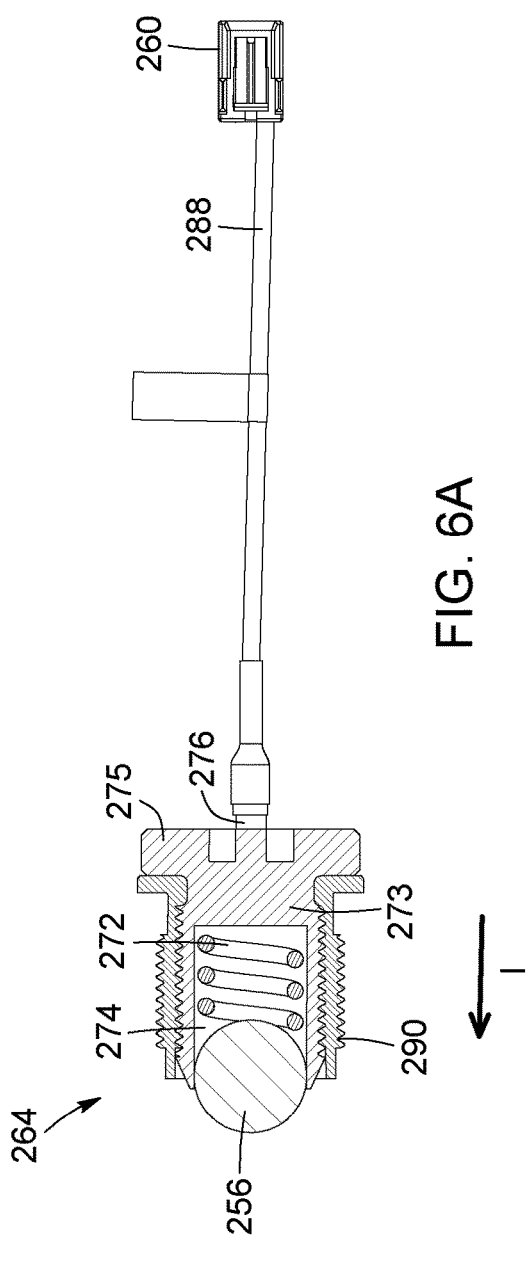
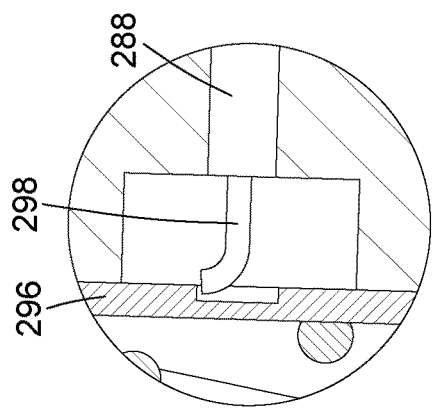
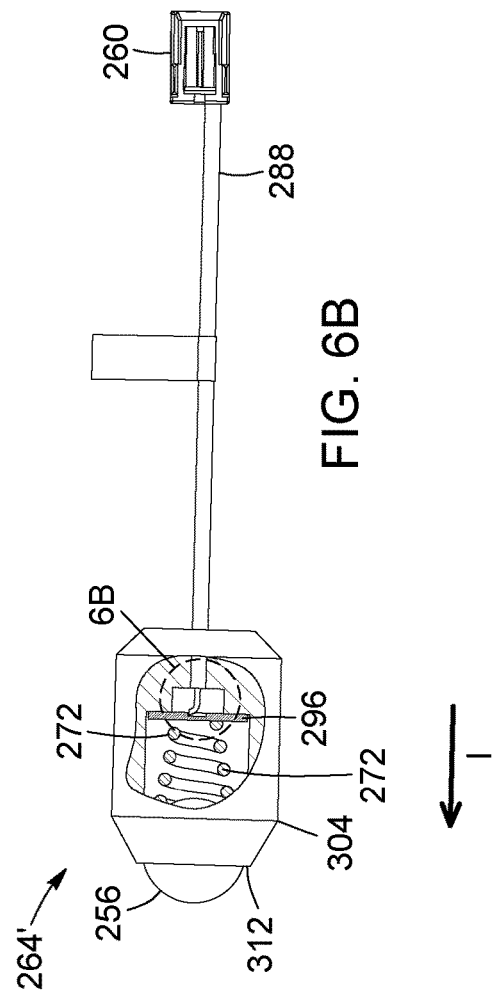

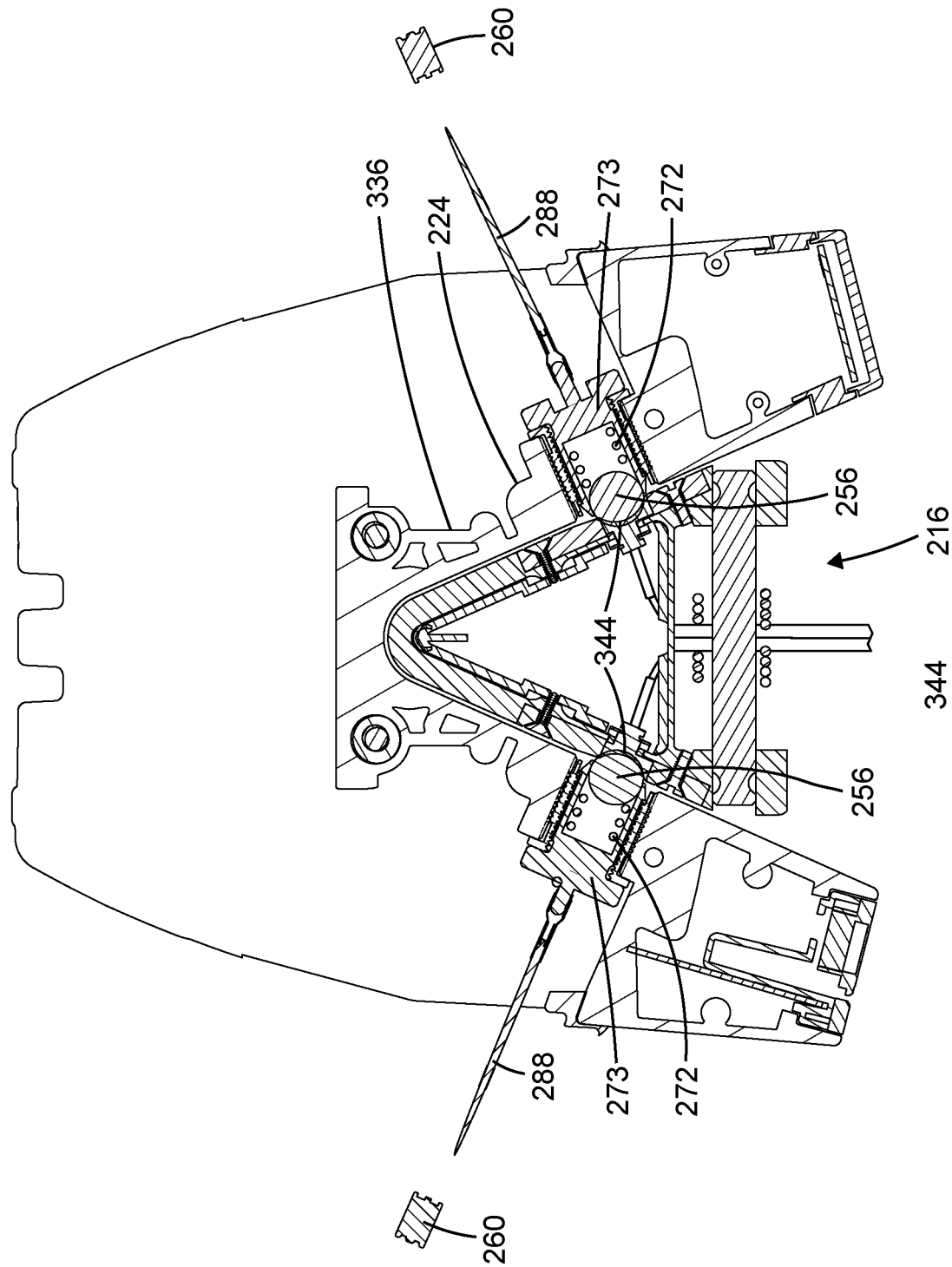

SYSTEM AND METHOD FOR SECURING, RECHARGING AND OPERATING AN ELECTRIC BICYCLE

CROSS-REFERENCE TO RELATED PATENT APPLICATION

The present application is a U.S. national application filed under 35 U.S.C. 371 to PCT International Application No. PCT/CA2018/050855 filed Jul. 13, 2018, which claims priority from U.S. provisional patent application No. 62/532,434, filed Jul. 14, 2017 and entitled "SYSTEM AND METHOD FOR SECURING AND RECHARGING AN ELECTRIC BICYCLE", the disclosure of each of which is hereby incorporated by reference in its entirety.

TECHNICAL FIELD

The present disclosure generally relates to systems and methods for securing and recharging an electric bicycle and more particularly to systems and methods in which mateable male and female connecting assemblies provide securing of an electric bicycle to a docking frame while also enabling recharging of the electric bicycle.

BACKGROUND

Being able to secure and selectively lock a bicycle to a docking frame is useful in various applications. For example, various bicycle-sharing systems use bicycle racks each having a plurality of docking frames. The bicycle racks are distributed geographically. A user can rent a bicycle by removing the bicycle from the docking frame of a first bicycle rack, ride the bicycle to another geographical area where a second bicycle rack is located, and return the bicycle by docking the bicycle to the docking frame at the second bicycle rack.

U.S. Pat. No. 8,061,499 describes a method and apparatus for securing a movable item to a structure, which may be used to selectively lock a bicycle to a docking frame of a bicycle rack.

SUMMARY

According to one aspect, there is provided a securing system for securing an electric bicycle to a bicycle docking frame. The securing system includes a female connecting assembly mountable on the bicycle docking frame and a male connecting assembly mountable on the electric bicycle. The female connecting assembly includes an electrically insulated body having inwardly facing opposed sidewalls defining a tapered recess and first current coupling elements positioned in a respective one of the opposed sidewalls. The male connecting assembly includes an electrically insulated tapered body having opposed sidewalls converging towards each other and being sized to be received within the tapered recess of the female connecting assembly and second current coupling elements being received in a respective one of the opposed sidewalls, each second current coupling element being positioned to electrically interface with a corresponding first current coupling element upon the electrically insulated tapered body of the male connecting assembly being received within the tapered recess of the female connecting assembly.

According to another aspect, there is provided a bicycle rack system comprising a plurality of electric bicycles, a plurality of bicycle docks, a top-level charging module and a charging controller. Each electric bicycle includes a battery module for storing electrical energy and a motor powered by the electrical energy stored in the battery module and operable to provide mechanical power to at least one wheel of the electric bicycle. The plurality of bicycle docks is each configured to receive one of the electric bicycles docked therewith and each has a dock-side charging module operable to selectively provide an electric current to the battery module of the electric bicycle docked therewith. The top level charging module is operable to receive electrical power from an external power source and to selectively provide electrical power to the dock-side charging module of one or more of the bicycle docks. The charging controller is configured for adjusting the level of electrical power provided by the top-level charging module to the dock-side charging modules of the one or more bicycle docks.

According to yet another aspect, there is provided a method for managing charging of one or more electric bicycles of a bicycle rack system. The method includes receiving, within a plurality of bicycle docks of the bicycle rack system, one or more electric bicycles, each bicycle comprising a battery module for storing electrical energy and a motor powered by the electrical energy stored in the battery and each bicycle dock having a dock-side charging module operable to selectively provide an electric current to the battery module of the electric bicycle docked therewith and selectively adjusting the level of electrical power received from an external power source and provided to the dock-side charging modules of the bicycle docks.

According to yet another aspect, there is provided an electric bicycle having a battery module for storing electrical energy, a motor powered by the electrical energy stored in the battery module and operable to provide mechanical power to at least one wheel of the electric bicycle, a communication module configured for receiving a user ride profile from an external device and a motor control module for adjusting operation of the motor based on the user ride profile.

According to yet another aspect, there is provided a method for controlling operation of an electric bicycle having a communication module for data communication, a battery module for storing electrical energy and a motor powered by the electrical energy stored in the battery module and operable to provide mechanical power to at least one wheel of the electric bicycle. The method includes receiving a user ride profile from a device external to the electric bicycle and adjusting operation of the motor based on the user ride profile.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which:

FIG. 4A illustrates a rear perspective view of a bicycle being secured to a bicycle rack according to the prior art embodiment;

FIG. 4B illustrates a close-up view of the bicycle being secured to the bicycle rack according to the prior art embodiment;

FIG. 6A illustrates a partial cutaway view of a biasing assembly according to one example embodiment;

FIG. 6B illustrates a partial cutaway view of a biasing assembly according to one alternative example embodiment;

FIG. 6C illustrates a close-up view of an interface between the backing plate, the conductive biasing element and the insulated wire of the biasing assembly according to the alternative example embodiment;

FIG. 8B illustrates a first section plan view of the secured system in the secured position according to the example embodiment;

Figure 1:
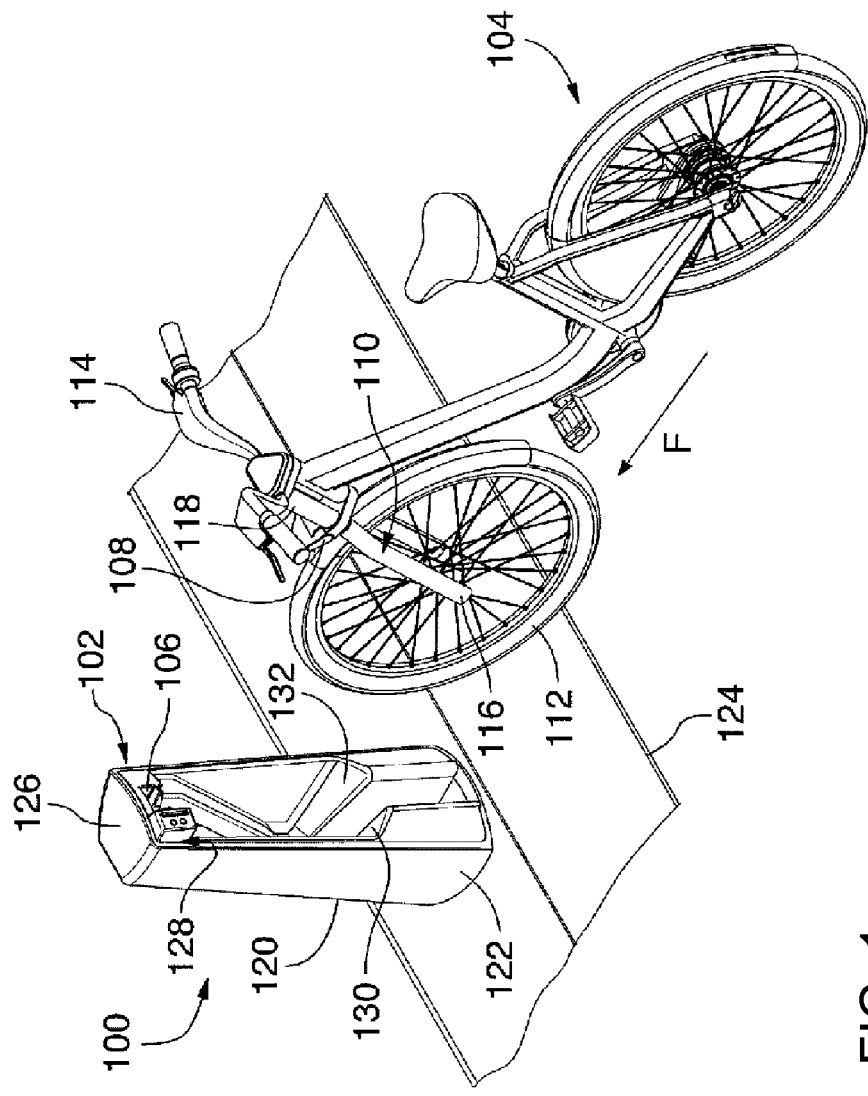
FIG. 1 illustrates a left rear perspective view of a bicycle rack having a docking frame and a bicycle being removed from the docking rack according to a prior art embodiment.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

It will be appreciated that, for simplicity and clarity of illustration, where considered appropriate, reference numerals may be repeated among the figures to indicate corresponding or analogous elements or steps. In addition, numerous specific details are set forth in order to provide a thorough understanding of the exemplary embodiments described herein. However, it will be understood by those of ordinary skill in the art, that the embodiments described herein may be practiced without these specific details. In other instances, well-known methods, procedures and components have not been described in detail so as not to obscure the embodiments described herein. Furthermore, this description is not to be considered as limiting the scope of the embodiments described herein in any way but rather as merely describing the implementation of the various embodiments described herein.

An "electric bicycle" herein refers to a bicycle that has an integrated electric motor which can be used for propulsion. The electric bicycle has one or more rechargeable batteries that provide electrical power to the motor.

Broadly described, various example embodiments described herein pertain to a securing system for securing an electric bicycle to a bicycle docking frame of a bicycle rack. A female connecting assembly mounted onto the docking frame can be mated with a male connecting assembly mounted onto an electric bicycle. The mating of the connecting assemblies physically secures the electric bicycle to the docking frame. The female and male connecting assemblies having cooperating current coupling elements that enable charging of the electric bicycle.

FIG. 1 is a rear perspective view of a bicycle rack having an electronic lock mounted thereon in accordance with one embodiment, with a bicycle removed from the bicycle rack.

Figure 2:
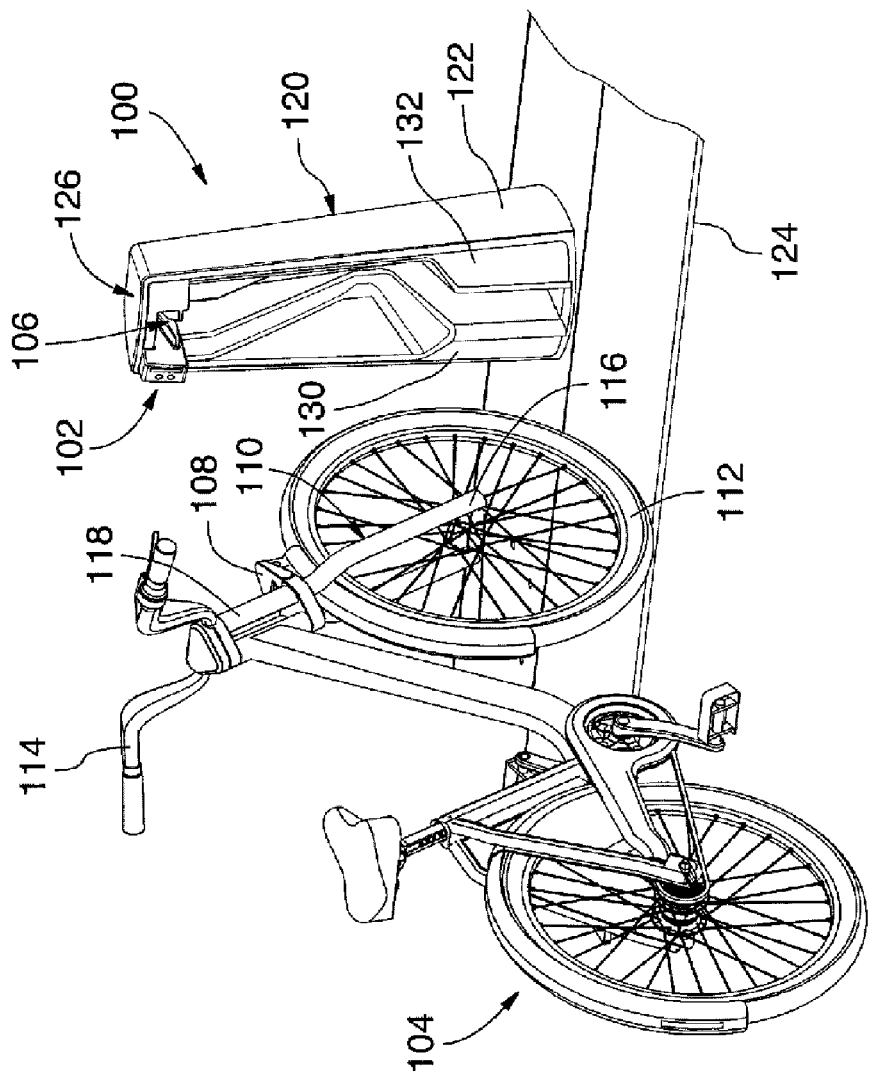
FIG. 2 illustrates a right rear perspective view of a bicycle rack having a docking frame and a bicycle being removed from the docking rack according to the prior art embodiment.
Figure 3:
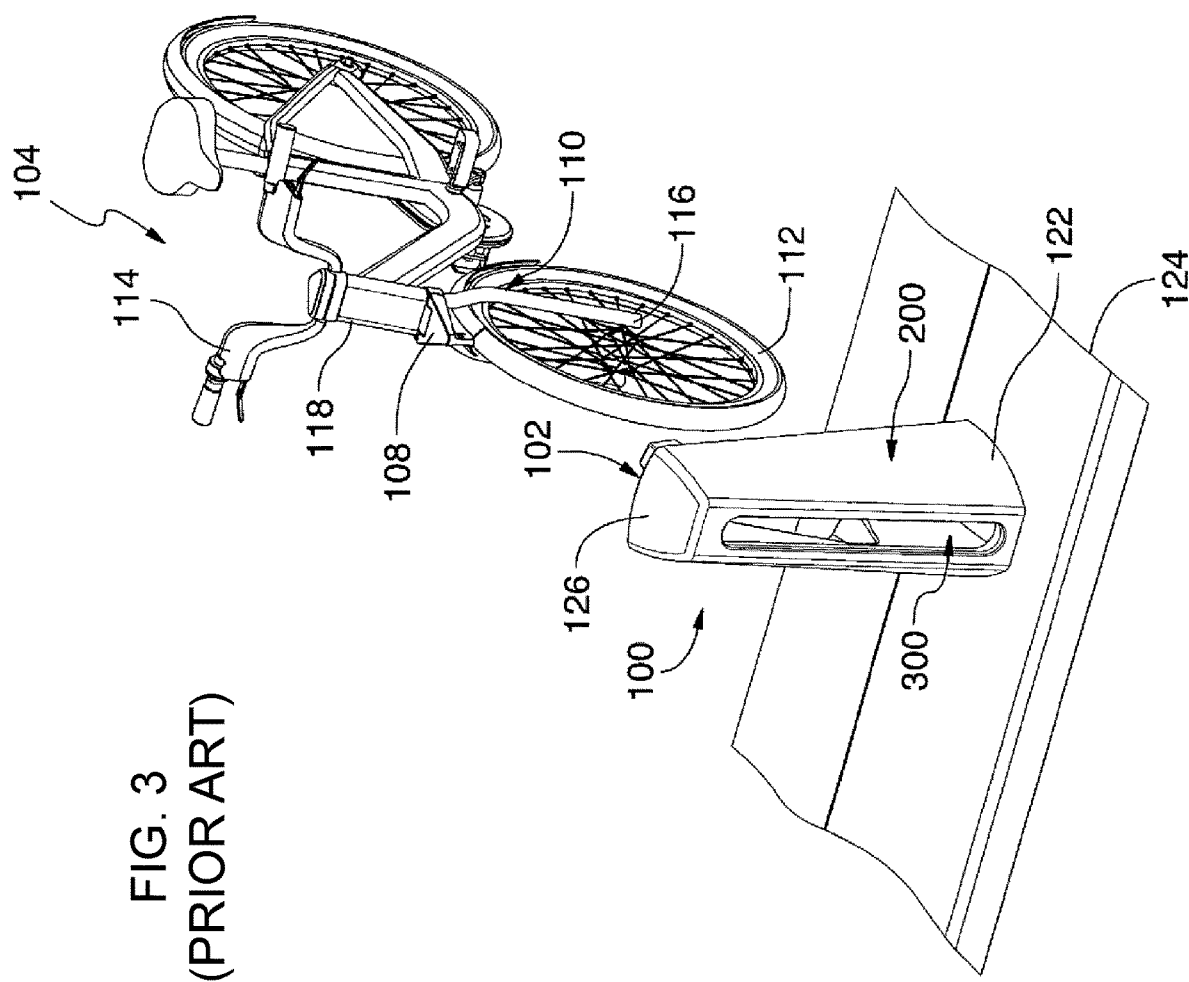
FIG. 3 illustrates a front perspective view of a bicycle rack having a docking frame and a bicycle being removed from the docking rack according to the prior art embodiment.

Now referring to FIGS. 1 to 3, therein illustrated are perspective views of a bicycle rack 100 having a docking frame 120 and a bicycle 104 being removed from the bicycle rack according to one prior art embodiment described, for example, in U.S. Pat. No. 8,061,499, which is hereby incorporated by reference in its entirety. The prior art bicycle rack 100 includes an electronic lock 102 mounted to the docking frame 120.

The prior art electronic lock 102 comprises first and second complementary cooperating connecting members, each being fixedly mounted to a respective one of the bicycle 104 and the bicycle rack 100. In the illustrated embodiment, the first connecting member comprises a female connector 106 mounted to the bicycle rack 100 and the second connecting member comprises a corresponding complementary male connector 108 mounted to the bicycle 104, as better shown in FIG. 2.

The male connector 108 and the female connector 106 are engageable together in a secured and lockable position.

In the prior art embodiment shown in FIGS. 1 to 3, the bicycle 104 comprises a front fork 110, a front wheel 112 and a handlebar 114. More specifically, the front fork 110 comprises a first lower end 116 having the front wheel 112 rotatably mounted thereto and a second opposed upper end 118 whereto the handlebar 114 is fixedly mounted. The skilled addressee will appreciate that, in such an embodiment, the handlebar 114 may be used to rotate the front wheel 112.

Still in the prior art embodiment shown in FIGS. 1 to 3, the male connector 108 is fixedly mounted to the front fork 110 of the bicycle 104. This configuration is of great advantage since it facilitates the engagement of the bicycle 104 in the bicycle rack 100.

Still referring to FIGS. 1 to 3, the bicycle rack 100 comprises a substantially vertical hollow elongated docking frame 120 having a first lower end 122 fixedly attached to a base 124 and an opposed upper end 126 comprising a female connector fixing recess 128. The female connector 106 is fixedly mounted in the female connector fixing recess 128 using fixing means (not shown) such as bolts and screws. The skilled addressee will appreciate that any other fixing means adapted to fixedly secure the female connector 106 in the recess 128 may be considered.

The base 124 comprises a structure adapted for mounting at least one bicycle rack thereon. The base 124 can have a substantially horizontal ground surface such as a parking lot, a sidewalk, a portion of a street or the like.

The female connector 106 can be vertically positioned at a level substantially corresponding to the level of the male connector 108 when the front wheel 112 of the bicycle 104 is lying on the base 124. This configuration helps the user of the bicycle 104 to guide the male connector 108 towards the female connector 106 without having to lift the bicycle 104, which is of great advantage.

The bicycle rack 100 can be part of a bicycle rental station, the bicycle rental station being part of a bicycle rental system. It will be appreciated that such a bicycle rental station is generally installed in a public area. Therefore, to prevent the female connector 106 from being tampered with, stolen or otherwise vandalized, the female connector fixing means (not shown) is advantageously robust and reliable.

The female connector fixing means can include fasteners provided with a corresponding special unfastening tool, the special unfastening tool being in the possession of an operator of the bicycle renting system. This configuration advantageously enables the operator to selectively remove the female connector from the bicycle rack for maintenance purposes or other purposes while preventing undesired removal of the female connector 106 from the bicycle rack 100 by an unauthorized person.

The female connector fixing can alternatively comprise welding the female connector 106 inside the female connector fixing recess 128. It will however be appreciated that any other means adapted for preventing an unauthorized removal of the female connector 106 from the bicycle rack 100 may be considered.

The female connector 106 and the hollow elongated docking frame 120 may form an integral structure.

As better shown in FIG. 3, the illustrated bicycle rack 100 further comprises a vertical wheel receiving slot 300 defined on the hollow elongated docking frame 120, this wheel receiving slot 300 being adapted to receive therein the front wheel 112 of the bicycle 104.

The hollow elongated docking frame 120 can further comprise a pair of wheel guiding members 130, 132 extending vertically between the lower end 122 and the opposed upper end 126 of the bicycle rack 100, the wheel guiding members 132, 134 being positioned on both sides of the wheel receiving slot 300, as best shown in FIG. 2.

The wheel guiding members 130, 132 enable the guiding of the bicycle wheel 112 forwardly when the bicycle 104 is engaging the wheel receiving slot 300. It will be appreciated that the wheel guiding members 130, 132 and the wheel receiving slot 300 may contribute to the alignment of the male connector 108 with the female connector 106, as it will become apparent below.

The skilled addressee will appreciate that various other configurations may be considered for the bicycle rack 100.

Now referring to FIGS. 4A and 4B, there is shown a bicycle 104 secured to a bicycle rack 100 using the electronic lock 102.

It will be appreciated that in the embodiment shown in FIGS. 4A and 4B, the male connector 108 and the corresponding female connector 106 are engaged together in the secured and lockable position, while in the embodiment shown in FIGS. 1 to 3, the male connector 108 is disengaged from the corresponding female connector 106.

It will be further appreciated that in the embodiment shown in FIGS. 4A and 4B, the front wheel 112 of the bicycle 104 is engaged in the wheel receiving slot 300, while in the embodiment shown in FIGS. 1 to 3, the front wheel 112 of the bicycle 104 is disengaged from the wheel receiving slot 300.

The operation of engaging the male connector 108 and the female connector 106 together in the lockable position will now be described in accordance with one embodiment, with reference to FIGS. 1 to 4A.

The bicycle 104 is first positioned near the bicycle rack 100, the male connector 108 generally facing towards the female connector 106, as shown in FIGS. 1 to 3. A user uses the handlebar 114 to rotate the front wheel 112 of the bicycle 104 until the front wheel 112 is aligned with the wheel receiving slot 300.

The bicycle 104 may now be moved forwardly in a direction F using the handlebar 114 such that the front wheel 112 of the bicycle 104 engages the wheel receiving slot 300, as shown in FIGS. 4A and 4B. It will be appreciated that the wheel guiding members 130, 132 further contributes to guide the bicycle wheel 112 forwardly into the wheel receiving slot 300.

It will be further appreciated that in this embodiment, guiding the front bicycle wheel 112 forwardly causes the male connector 108, mounted to the fork 110 of the bicycle, to be guided towards the female connector 106.

The bicycle is further moved forwardly in the direction F until the male connector 108 and the female connector 106 engage together in the secured and lockable position. Once they are engaged in the secured and lockable position, the electronic lock 102 can be used to lock the connectors 106, 108 together, thereby locking the bicycle 104 to the bicycle rack 100.

Figure 5A:
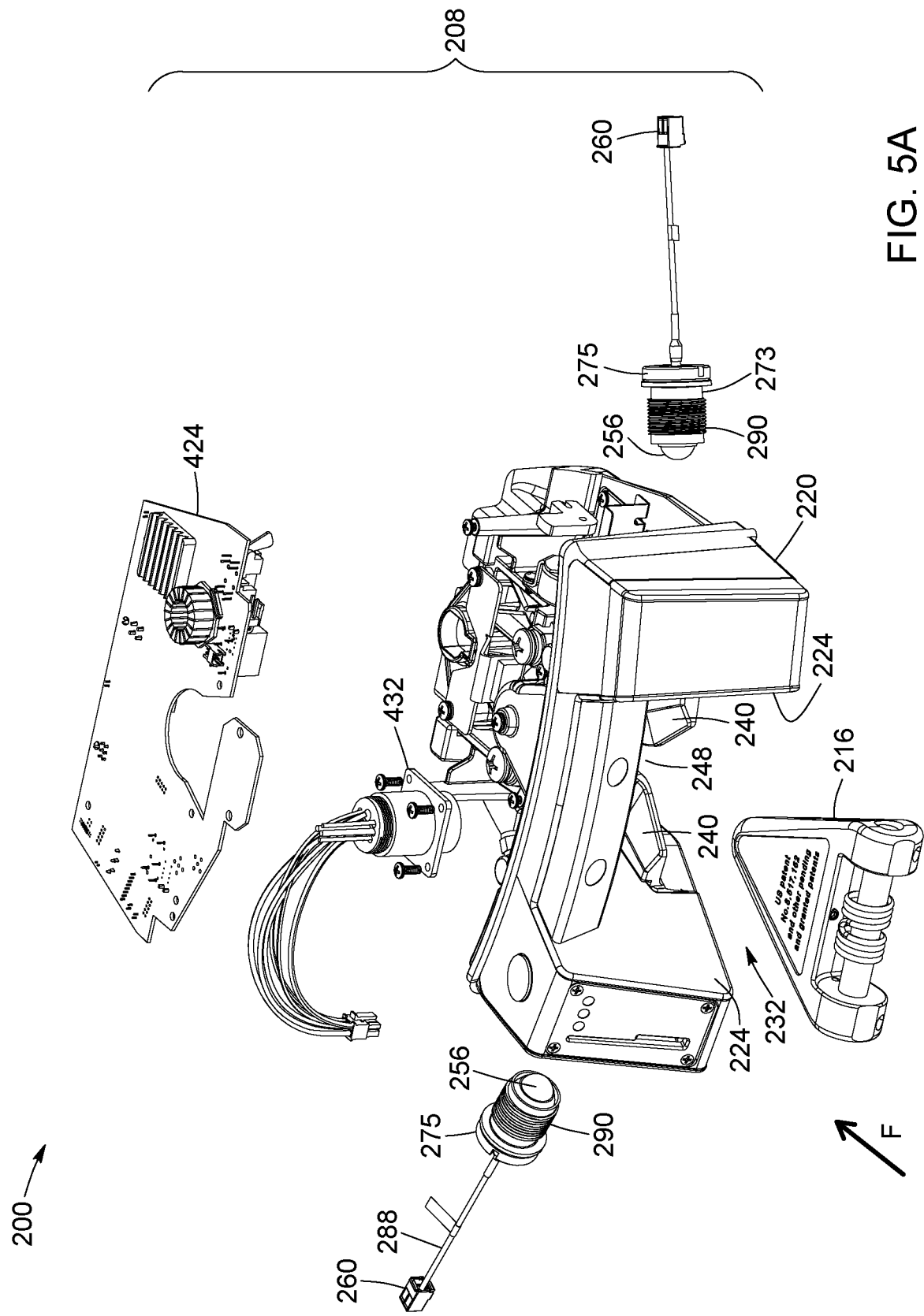
FIG. 5A illustrates a partial exploded view of the securing system according to one example embodiment.
Figure 5B:
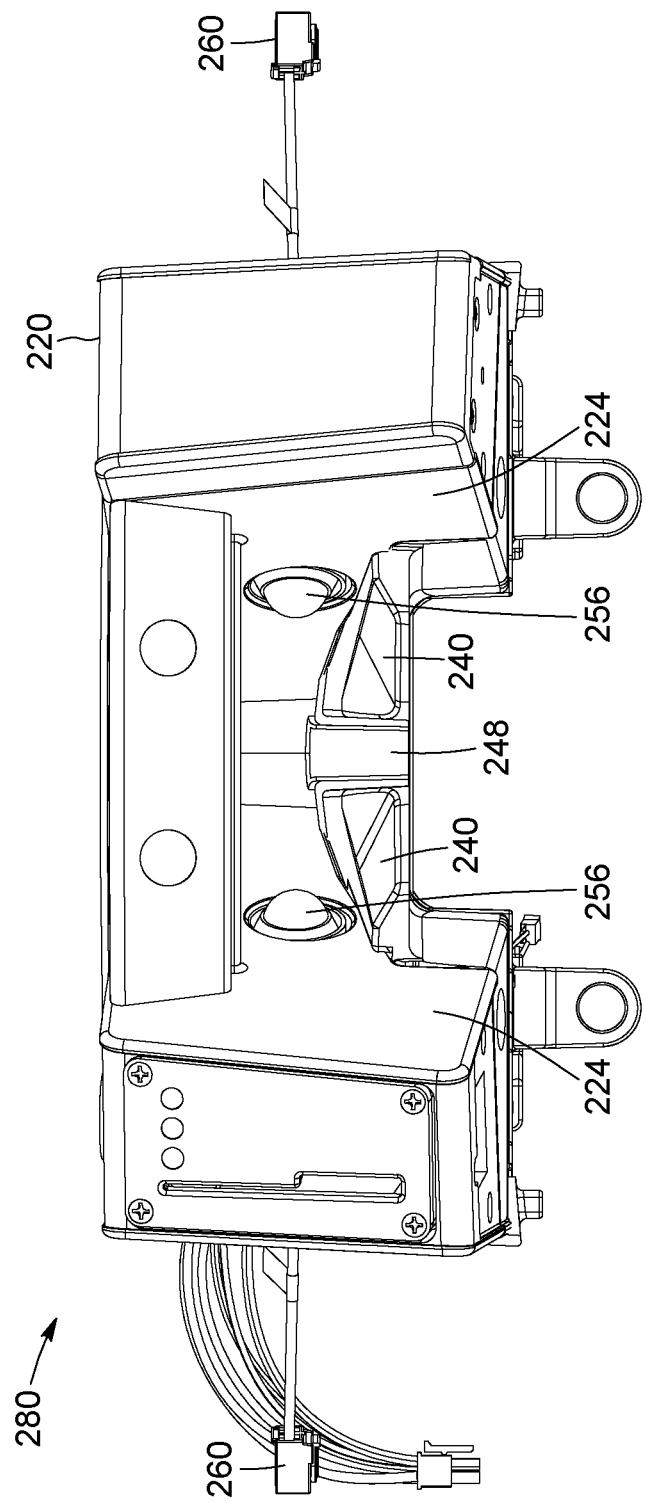
FIG. 5B illustrates a front elevation view of a female connecting assembly according to one example embodiment.

Referring now to FIG. 5A, therein illustrated is a partial exploded view of the securing system 200 according to one example embodiment. FIG. 5B illustrates a front elevation view of the female connecting assembly 208 according to one example embodiment. The securing system 200 is operable to secure the bicycle 104 to the bicycle rack 100. The securing system 200 is further operable for use with an electric bicycle, whereby the electrical battery of the electric bicycle can be charged through the securing system 200. The securing system 200 is also effective for securing conventional non-electric bicycles.

The bicycle 104 being "secured" to the bicycle rack 100 herein refers to the bicycle 104 being sufficiently physically engaged with the bicycle rack such that a sufficient mechanical force needs to be applied to unsecure the bicycle 104 from the bicycle rack 100. Accordingly, the bicycle 104 is not easily removed from the bicycle rack 104, such as being tipped over from being out of balance. The bicycle 104 can be locked to the bicycle rack 100 using a locking mechanism, such as the electronic lock 102 described herein, but it will be understood that the bicycle 104 is not necessarily locked to the bicycle rack 100 when secured.

The securing system 200 can be provided in place of the electronic lock 102 of the prior art bicycle rack 100 and prior art bicycle 104 described herein with reference to FIGS. 1 to 4A. The securing system 200 may be installed on newly fabricated bicycle racks 100 and newly fabricated bicycles 104. The securing system 200 may also be retrofitted to existing bicycle racks 100 and/or existing bicycles 104 to replace existing electronic locks 102.

The securing system 200 includes a female connecting assembly 208 and a male connecting assembly 216. The female connecting assembly 208 can be mounted on the bicycle rack 100 at the same location and in substantially the same way as the prior electronic lock 102. It will be understood that additional electrical and electronic connections may be required, as described elsewhere herein.

The female connecting assembly 208 includes a female connector body 220 that partially houses various electronic components of the female connecting assembly 208. The female connector body 220, when installed onto the bicycle rack 100, is electrically insulated to prevent current flow to the electronic components via the female connector body 220. As described elsewhere herein, portions of the female connector body 220 may be electrically non-conductive.

It will be understood that while portions of the female connector body 220 are illustrated as being open in FIGS. 5A and 5B, such portions are closed off when the female connector body 220 is appropriately installed within the docking frame 120 of the bicycle rack 100. When so installed, the walls of the female connector body 220 cooperate with the inner walls of the docking frame 120 to substantially close in the electronic components.

The female connector body 220 includes a pair of inwardly facing opposed sidewalls 224. The sidewalls 224 define a tapered recess 232 of the electrically insulated body. The female connector body 220 can further include opposed sitting members 240 extending inwardly from the inwardly facing opposed sidewalls 224. The edges of the opposed sitting members 240 may define a slot 248 therebetween.

The female connecting assembly 208 further includes first current coupling elements 256. The first current coupling elements 256 are connected to electrical connectors 260, which further connects the first current coupling elements 256 to a source of electric current.

Referring now to FIG. 5B only, the first current coupling elements 256 are positioned in respective one of the opposed sidewalls 224 so that they form part of the surface of the opposed sidewalls 224. For example, and as illustrated, the first current coupling elements 256 is raised from their respective surfaces of the opposed sidewalls 224. The current coupling elements 256 may have a spherical or elliptical shape. Each opposed sidewall 224 may have a throughhole formed therein, and the first current coupling elements 256 project through the throughhole of their respective opposed sidewalls 224.

Referring now to FIG. 6A-6C, therein illustrated are views of a biasing assembly 264 according to one example embodiment and an alternative example embodiment. A plurality of biasing assemblies 264 may be provided within the female connecting assembly 208. The biasing assembly 264 includes one of the first current coupling elements 256 and one of the electrical connectors 264. The biasing assembly 264 further includes a biasing element 272, such as a spring member, that engages the first current coupling element 256. The biasing element 272 urges the first current coupling element in a direction I, which corresponds to a direction towards the other opposed sidewall 224 when the first current coupling element 256 is appropriately positioned within its sidewall 224. The biasing assembly 264 further includes an insulated wire 288 providing an electrically conductive path between the first current coupling element 256 and the electrical connector 260.

According to one example embodiment, and as illustrated in FIGS. 6A and 6B, the biasing assembly 264 includes an electrically conductive body 273 that defines a channel 274. The first current coupling element 256 is in the shape of a ball and is positioned at a frontal portion of the electrically conductive body 273. A portion of the first current coupling element 256 protrudes from a frontal opening of the electrically conductive body 273. The biasing element 272 is also positioned within channel 274 and urges the first current coupling element 256 towards the front of the electrically conductive body 273 such that the first current coupling element 256 contacts the electrically conductive body 273 and forms an electrically conductive path therewith. The diameter of the first current coupling element 256 may be greater than the diameter of the frontal opening of the electrically conductive body 273 such that the first current coupling element 256 is retained between the frontal portion of the electrically conductive body 273 and the biasing element 272. The electrically conductive body 273 further includes a backing plate portion 275 at a rear end of the electrically conductive body 273. A rear end of the biasing element 272 abuts against an inner surface of the backing plate portion 275. In one embodiment, and as illustrated, a male electrically conductive pin 276 extends from an outer surface of the backing plate portion 274. The electrically conductive body 273 provides an electrical conductive path between the first current coupling element 256 and the male electrically conductive pin 276. The insulated wire 288 can be connected to the conductive pin 276 so as to further provide an electrically conductive path between the first current coupling element 256 and the electrical connector 260. The biasing assembly 264 further includes an electrically insulating sleeve 290 that wraps around sidewalls of the electrically conductive body 273. As best seen in FIG. 8B, the insulated sleeve 290 (and the biasing element 272) extends through a channel formed in respective one of the opposed sidewalls 224 of the insulated body 216. The insulated sleeve 290 prevents undesired electrical contact of the biasing assembly 264 with other electrical and/or electronic components of the female connecting assembly 208. The insulated sleeve 290 can allow the biasing assembly 264 to meet various safety criteria, such as those defined in IEC60950-1 and -22 (primarily concerned with creepage distance and clearance). The combination of the first current coupling element 256, biasing element 272, electrically conductive body 273 with backing plate portion 275 and electrically insulated sleeve 290 form a ball plunger mechanism.

According to another example embodiment, and as illustrated in FIGS. 6B and 6C, the biasing element 272 is electrically conductive and forms part of the conductive path between the first current coupling element 256 and the electrical connector 260. The alternative biasing assembly 264' may further include a backing plate 296. The backing plate 296 forms an electrical conductive interface between the electrically conductive biasing element and the wire 288. FIG. 6D illustrates a close-up view of an interface between the backing plate 296, the conductive biasing element 272 and the insulated wire 288. An end of the conductive biasing element 272 physically contacts a front surface of the backing plate 296 to form an electrical connection. Similarly, an exposed end of the insulated wire 288 contacts a rear surface of the backing plate 296 to form an electrical connection. The insulated wire 288 can form a braze 298 with the rear surface of the backing plate 296. Furthermore, and as illustrated, the alternative biasing assembly 264' may include an electrically insulating sheath 304 that houses electrically conductive elements, such as the electrically conductive biasing element 272, the backing plate 296, and the exposed end of the insulated wire 288. The sheath 304 includes an opening 312 to expose the first current coupling element 256. The combination of the first current coupling element 256, biasing element 272, backing plate 296 and electrically insulated sheath 304 form a ball plunger mechanism.

The biasing assembly 264 is positioned within the electrically insulated body 216 of the female connecting assembly 208. As best seen in FIG. 8B, the insulated sheath 304 (and the biasing element 272) extends through a channel formed in respective one of the opposed sidewalls 224 of the insulated body 216. The insulated housing 304 prevents undesired electrical contact of the alternative biasing assembly 264' with other electrical and/or electronic components of the female connecting assembly 208.

Figure 7A:
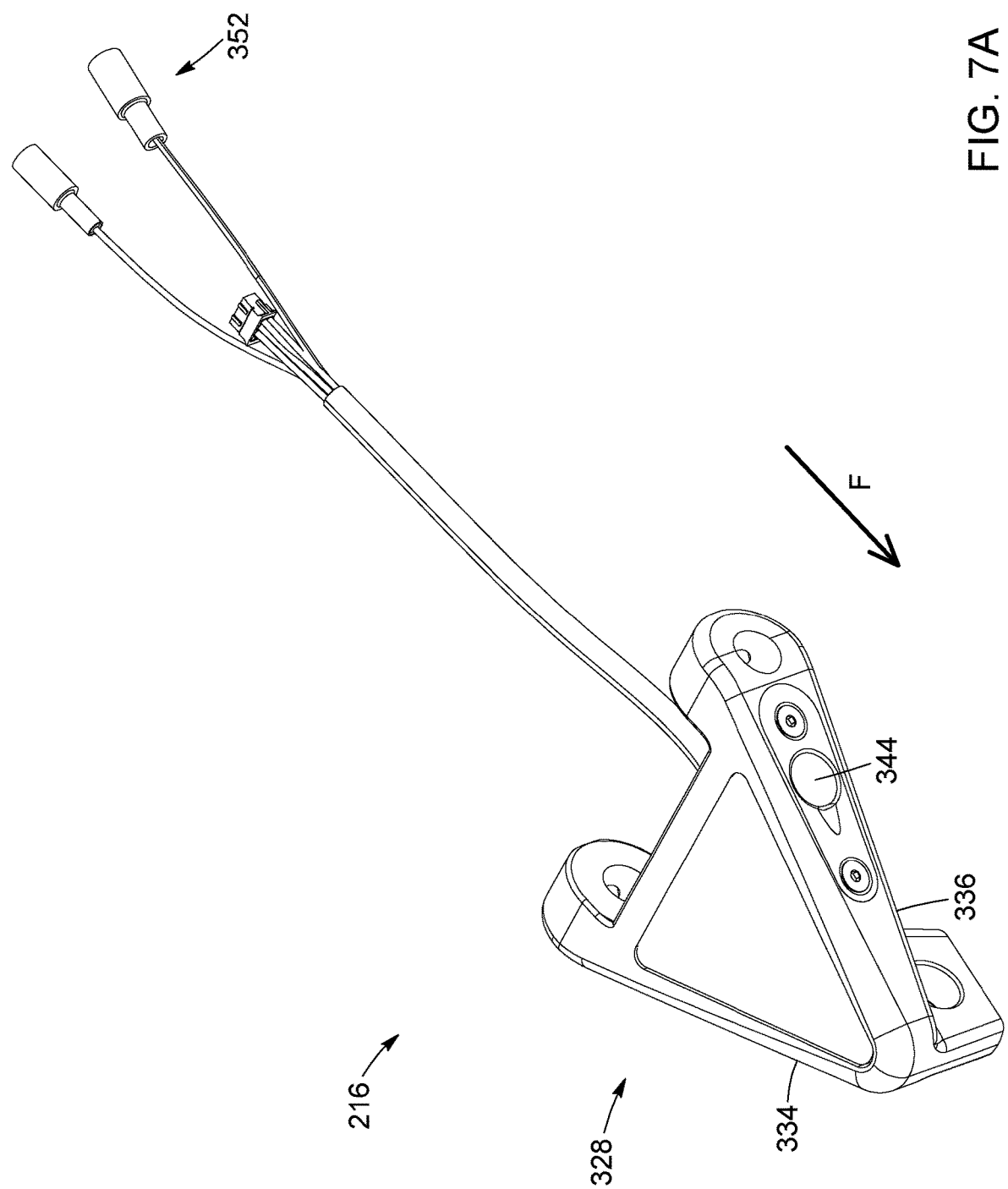
FIG. 7A illustrates a perspective view of a male connecting assembly of the secure system according to one example embodiment.
Figure 7B:
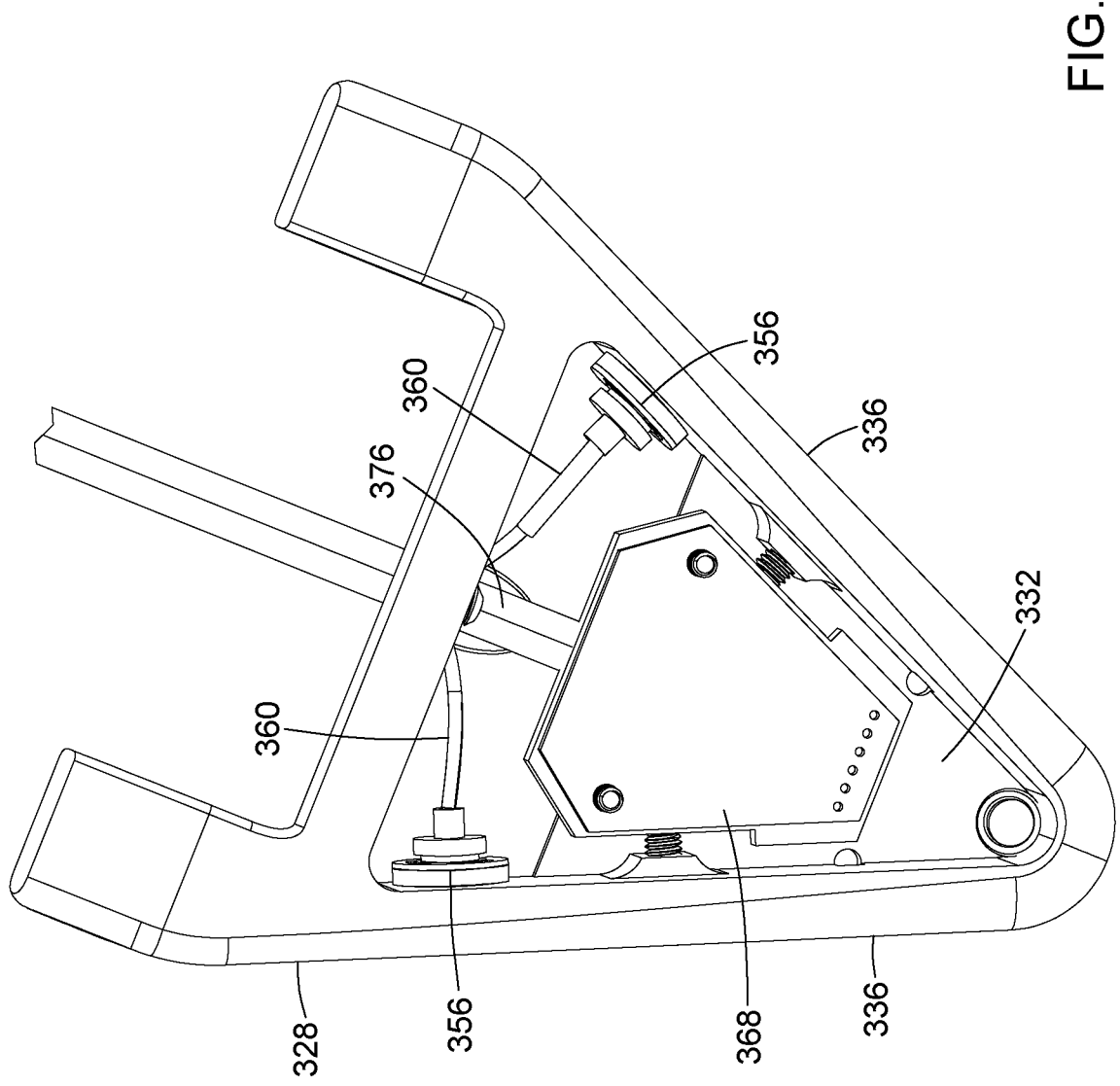
FIG. 7B illustrates a close-up view of the male connecting assembly with the lid member removed according to one example embodiment.

Referring back to FIG. 5A, the securing system 200 further includes the male connecting assembly 216 configured to co-operate with the female connecting assembly 208. FIG. 7A further illustrates a perspective view of a male connecting assembly 216. The male connecting assembly 216 includes an electrically insulated tapered body 328 having an inner chamber 332 (FIG. 7B). Various electronic components of the male connecting assembly 216 are housed within the inner chamber 332. A lid member 334 may be provided to enclose the inner chamber 332. The electrically insulated tapered body 328 is size to fit snugly within the tapered recess 232 defined by the female connector body 220 of the female connecting assembly 208. The electrically insulated tapered body 328 can be advanced in the direction F to be inserted into the tapered recess 232.

In operation, the male connecting assembly 216 is mounted onto an electric bicycle. The male connecting assembly 216 may be mounted in the same manner as the male connector 108 of the prior art bicycle rack 100 described herein with reference to Figurers 1 to 4A. The male connecting assembly 216 can be mounted onto the front fork 110 of a bicycle 104. The male connecting assembly 216 may include a back portion (not illustrated) that mounts onto the fork 110. The tapered body 328 is attached to the back portion via a hinge 335 (FIG. 7C), whereby the tapered body 328 can pivot with respect to the back portion.

The electrically insulated tapered body 328 of the male connecting assembly 216 has opposed sidewalls 336 that define the tapered body 328. The opposed sidewalls 336 define an angle that substantially corresponds to an angle defined by opposed sidewalls 224 of the female connecting assembly 208. Accordingly, when the tapered body 328 of the male connecting assembly 328 is received within the recess 232 of the female connecting assembly 208, each opposed sidewall 336 is aligned with a corresponding opposed sidewall 224.

The male connecting assembly 216 further includes second current coupling elements 344. The second current coupling elements 344 are connected to electrical connectors 352, which further connect the second current coupling elements 344 to a rechargeable battery of the electrical bicycle to which the male connecting assembly 216 is mounted.

The second current coupling elements 344 are positioned on the surface of a respective one of the opposed sidewalls 336 of the tapered body 328. The location of each second current coupling element 344 on its respective sidewall 336 is such that the second current coupling element 344 is aligned with, and interfaces with, a corresponding first current coupling element 256 upon the electrically insulated tapered body 328 being received within the recess 232 of the female connecting assembly 208.

Upon each first current coupling element 256 interfacing with a corresponding second current coupling element 344, an electrical coupling is formed between each pairing of the first and second current coupling elements 256, 344.

According to one example embodiment, the first current coupling element 256 is formed of an electrically conductive material and the second current coupling element 344 is also formed of an electrically conductive material. When the first current coupling element 256 interfaces with a corresponding second current coupling element 344, the electrical coupling therebetween is formed from physical contact between the current coupling elements 256, 344. Current can flow between the interfaced current coupling elements 344 through that physical contact point.

According to another example embodiment, the first current coupling element 256 includes one or more inductive coupling sub-elements, such as electromagnetic coils. Similarly, the second current coupling elements 256 also includes one or more inductive coupling sub-elements, such as electromagnetic coils. When the first current coupling element 256 interfaces with a corresponding second current coupling element 344, the electrical coupling therebetween is formed from the current coupling elements 256, 344 being sufficiently close to one another such that current flow in one of the current coupling elements induces current flow in the other of the current coupling elements.

It will be understood that electrical coupling, current coupling, or variants thereof herein refers to both current flow from contact between electrically conductive elements and current flow from induction.

A surface of each second current coupling element 344 that interfaces with the first current coupling element 256 of the female connecting assembly 208 can be shaped to cooperate with the shape of the first current coupling element 256. For example, the interfacing surface of the second current coupling element 344 can be concave (ex: hemispherical or semi-elliptical) to cooperate with the ball-shaped (spherical or elliptical) first current coupling element 256. When cooperatively interfaced with one another, the portion of the first current coupling element 256 protruding from opposed sidewalls 224 of the female connector body 220 is received within the concave recess of the second current coupling element 344. It will be appreciated that the first current coupling element 256 may be urged towards the second current coupling element 344 from the biasing force provided by the biasing element 272 of its biasing assembly 264.

The interfacing of the first current coupling elements 256 with corresponding second current coupling elements 344 causes the male connecting assembly 216 to be temporarily secured to the female connecting assembly 208. It will be appreciated that the interfacing of the first and second current coupling elements 256, 344 provides both a physical coupling (which provides the temporarily securing) and an electrical coupling (which allows current flow between the current coupling elements 256, 344).

The male connecting assembly 216 is temporarily secured to the female connecting assembly 208 in that application of a sufficient force is required to disengage and withdraw the male connecting assembly 216 from the female connecting assembly 208. Accordingly, when the female connecting assembly 208 is appropriately installed onto the frame 120 of the bicycle rack 100 and the male connecting assembly 216 is appropriately mounted onto a bicycle 104, temporarily securing the male connecting assembly 216 to the female connecting assembly 208 causes the bicycle 104 to be temporarily secured to the docking frame 120 of the bicycle rack 100.

The male connecting assembly 216 can be unsecured from the female connecting assembly 208 by applying a sufficient mechanical force on the male connecting assembly 216 in the direction opposite to direction F. This force is sufficiently strong so as to cause the biasing element 272 of each biasing assembly 264 to be sufficiently compressed such that the first and second current coupling elements 256, 344 are disengaged from one another.

Referring now to FIG. 7B, therein illustrated is a close-up view of the inner chamber defined by the tapered body 328 (with lid member 330 being hidden from view). A rear portion 356 of each of the second current coupling elements 344 are housed within the inner chamber 332 and are electrically connected to electrical wires 360 that further connect to electrical connectors 352.

Various electronic components, such as components for data communication, as described elsewhere herein, are also housed within the inner chamber 332. For example, and as illustrated in FIG. 7B, a printed circuit board 368 implementing the electronic components and being connected to data signal wires 376 are housed within the inner chamber 332.

Figure 7C:
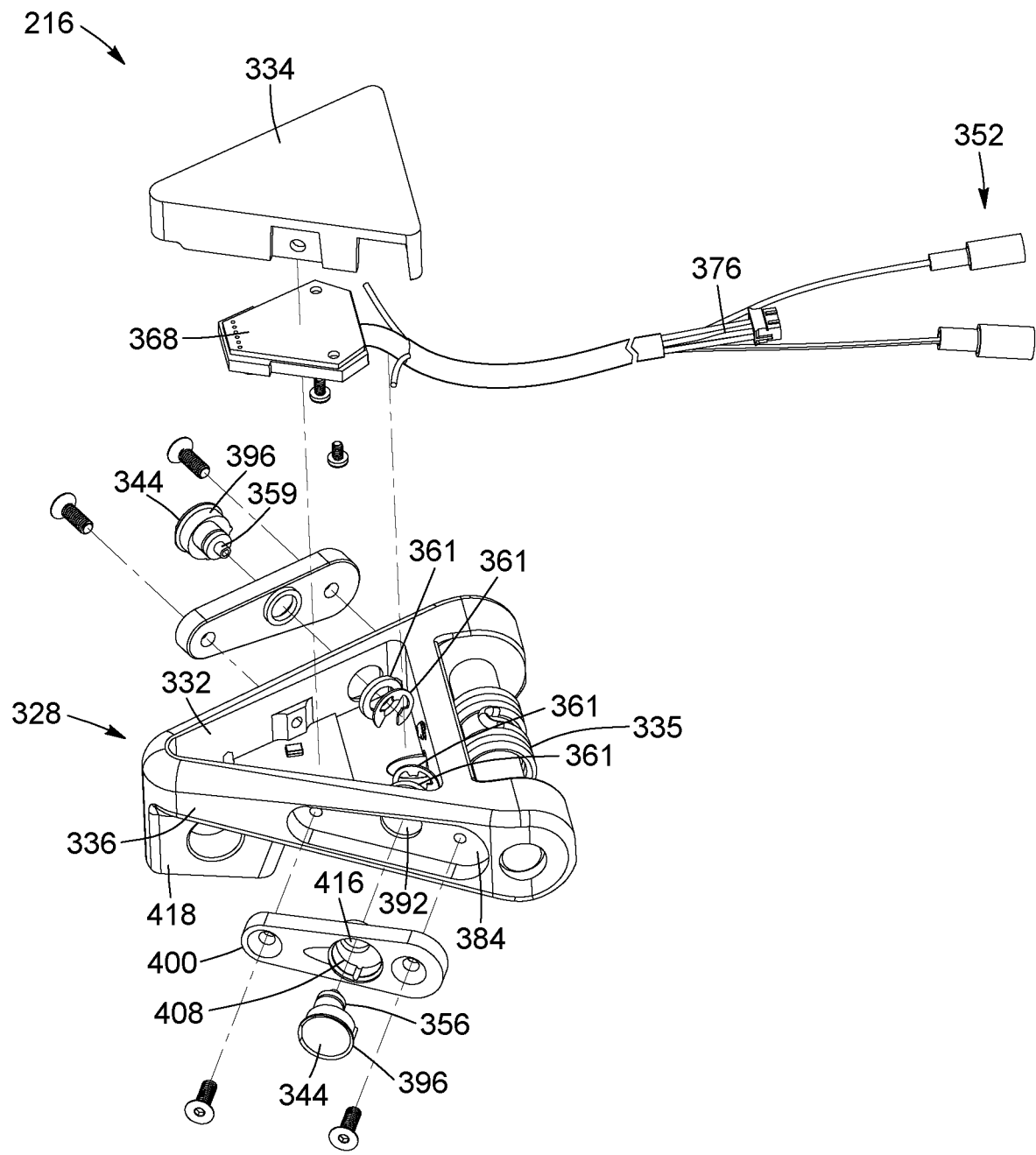
FIG. 7C illustrates a top exploded view of the male connecting assembly according to the example embodiment.
Figure 7D:
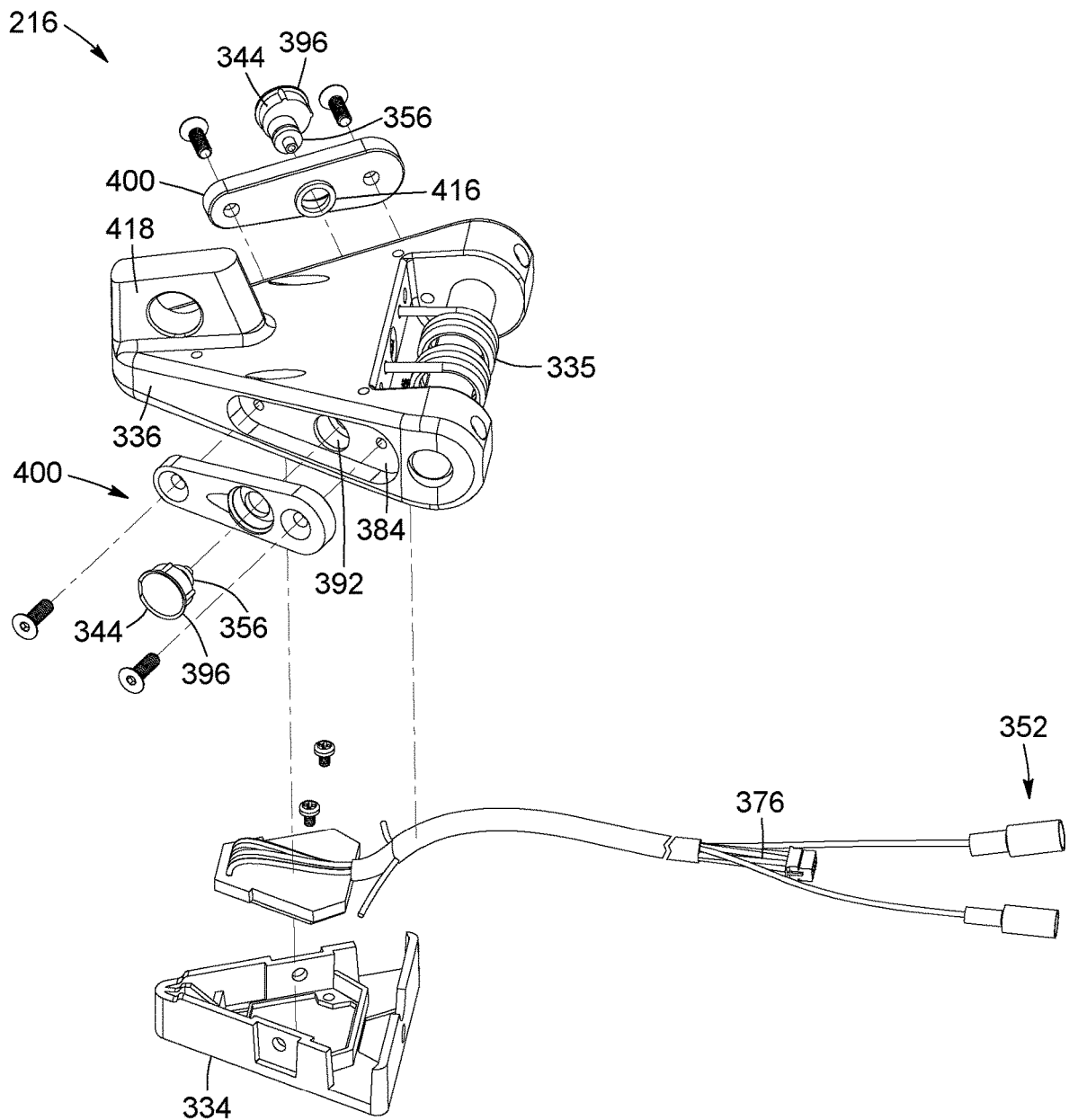
FIG. 7D illustrates bottom exploded view of the male connecting assembly according to the example embodiment.

Referring now to FIGS. 7C and 7D, therein illustrated is a top exploded view and bottom exploded view, respectively of the male connecting assembly 216 according to one example embodiment. The opposed sidewalls 336 of the tapered body 328 each define a receiving recess 384 and a throughhole 392 positioned within the receiving recess 384 that provides communication between the inner chamber 332 of the tapered body 328 and the space outside the tapered body 328.

Each second current coupling connector 344 is positioned within the receiving recess 384 of its respective opposed sidewall 336. Each second current coupling connector 344 further has its rear portion 356 that extends through the throughhole 392 and into the inner chamber 332 of the tapered body 328. A front portion 396 of the second current coupling connector 344 faces in a same direction as the outer surface of the opposed sidewall 336, and is shaped to interface with a corresponding first current coupling connector 256.

According to an example embodiment, and as illustrated, the male connecting assembly 216 further includes non-conductive gasket members 400 being received within the receiving recess 384 of a respective one of the opposed sidewalls 336. Each gasket member 400 further defines an inner receiving recess 408 having a throughhole 416. When each non-conductive gasket member 400 is received within the receiving recess 384 of the respective opposed sidewall 336, the inner receiving recess 408 and the throughhole 416 are aligned with the throughhole 392 of the opposed sidewall 336. The second current coupling element 344 is received within the inner receiving recess 408 and the rear portion 356 of the second current coupling element 344 projects through throughholes 416 and 392 to connect to the electrical wires 360. Eyelet members 361 may be provided within the inner chamber 332 and engage the second current coupling elements 344 to retain them in place with their respective opposed sidewalls 336.

It will be appreciated that when each second current coupling element 344 is appropriately positioned within the inner receiving recess 408 of the non-conductive gasket member 400, the front portion 396 of the second current coupling 344 is surrounded by the non-conductive gasket member 400. This ensures that current only flows between the first and second current coupling elements 256, 344 when appropriately interfaced with one another, and prevents current leakage to other elements of the female connecting assembly 208 or male connecting assembly 216.

A locking finger 418 extends from an underside of the tapered body 328 of the male connecting assembly 216. The locking finger 418 can be engaged by a movable locking member of the female connecting assembly 208 when the tapered body 328 is received within the recess 232. This engagement causes the male connecting assembly 208 to be locked with the female connecting assembly 216, thereby also locking the electric bicycle to the docking frame 120. The movable locking member and the locking finger 418 may be part of a locking assembly (element 506) as described in U.S. Pat. No. 8,061,499.

Figure 8A:
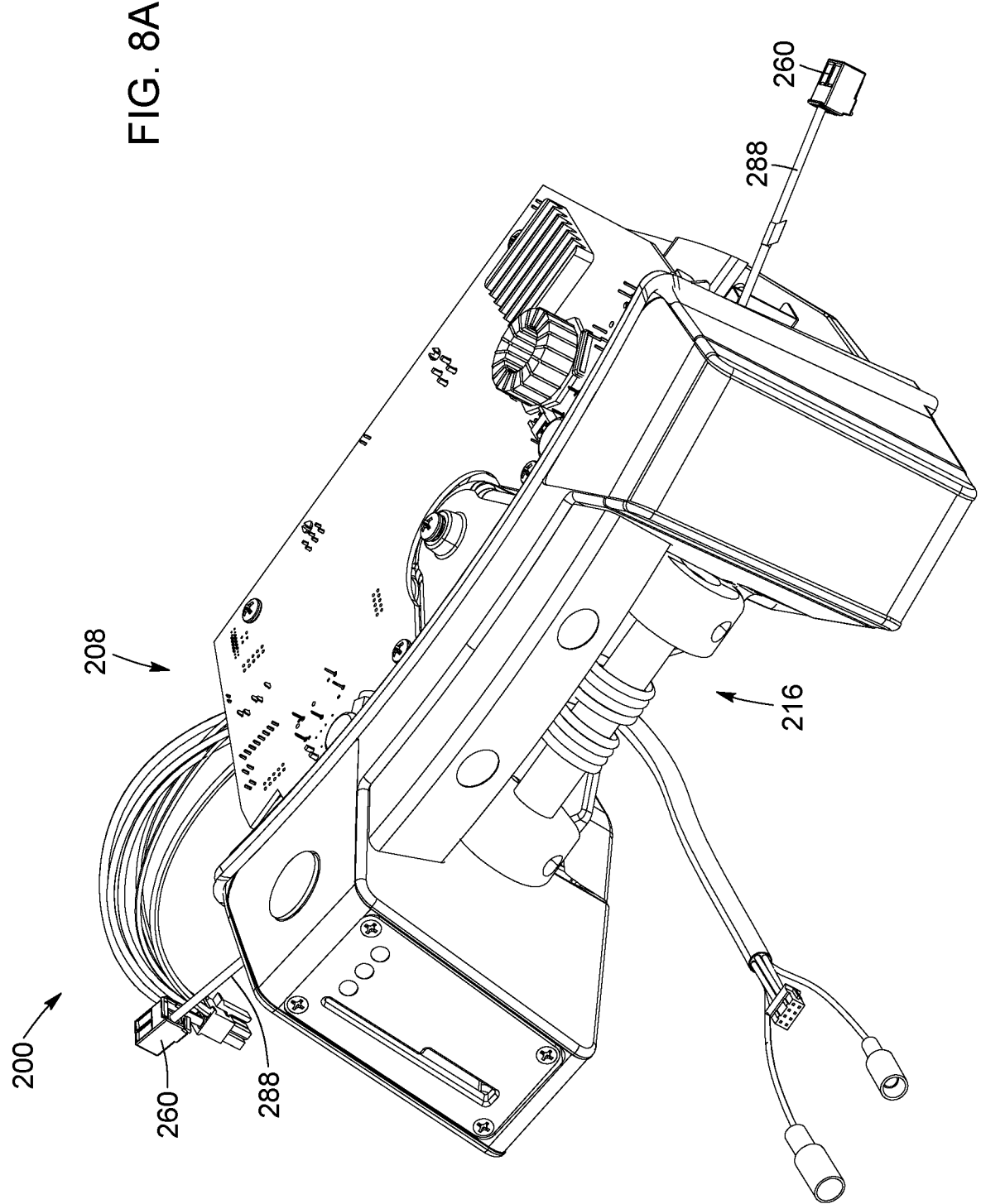
FIG. 8A illustrates a perspective view of the secured system in a secured position according to example embodiment.

Referring now to FIG. 8A, therein illustrated is a perspective view of the secured system 200 in a secured position. The tapered body 328 of the male connecting assembly 216 is received within the recess 232 defined by the female connecting assembly 208.

FIG. 8B illustrates a section plan view of the secured system 200 in the secured position. It will be appreciated that the opposed sidewalls 224 of the body 216 of the female connecting assembly 208 are aligned with and follow the contour of the opposed sidewalls 336 of the tapered body 328 of the male connecting assembly 208. Furthermore, first current coupling elements 256 being ball elements, interface with concave front surface of the second current coupling elements 344. The spring members 272 push the first current coupling elements 256 into the concave second current coupling elements 344 to form a mechanical engagement. As described elsewhere, this interfacing of the first and second current coupling elements 256, 344, causes the male connecting assembly 216 and female connecting assembly 208 to be temporarily secured to one another.

When in the secured position, an underside of tapered body 328 is supported by the sitting members 240 of the female connector body 220. The locking finger 418 of the tapered body 328 can be received in the slot 248 between the sitting members 240. The locking finger 418 is aligned with the movable locking member of the female connecting assembly 208 and can receive the movable locking member to lock the male and female connecting assemblies 208, 216.

As described elsewhere herein, the first current coupling elements 256 are connected via the electrical connectors 260 to a source of electrical power. The power source may include one or more high-power converters (ex: 3 kVA, 58V output) and backup converters (ex: 24V dc), that convert AC mains power to DC current that is effective for charging one or more electric bicycles.

The securing system 200 further includes an electronic control system for controlling the charging of an electric bicycle. The electronic control system includes a controller for receiving one or more data signals and for transmitting control signals for controlling whether current flows or does not flow from the power source to the first current coupling elements 256, to further charge an electric bicycle. The electronic control system may be powered by a low-voltage source (ex: 12V). A flyback converter (ex: 5-8 W) may be provided to supply the low-voltage source.

The controller described herein may be implemented in hardware or software, or a combination of both. It may be implemented on a programmable processing device, such as a microprocessor or microcontroller, Central Processing Unit (CPU), Digital Signal Processor (DSP), Field Programmable Gate Array (FPGA), general purpose processor, and the like. In some embodiments, the programmable processing device can be coupled to program memory, which stores instructions used to program the programmable processing device to execute the controller. The program memory can include non-transitory storage media, both volatile and non-volatile, including but not limited to, random access memory (RAM), dynamic random access memory (DRAM), static random access memory (SRAM), read-only memory (ROM), programmable read-only memory (PROM), erasable programmable read-only memory (EPROM), electrically erasable programmable read-only memory (EEPROM), flash memory, magnetic media, and optical media.

The controller of the securing system 200 for a given bicycle dock is operable to determine the type of bicycle (electric or non-electric) that is received within that bicycle dock. More particularly, the electronic control system includes a sensor for reading an identifier tag of the bicycle received in the frame. The identification tag indicates the type of the bicycle. The identifier tag may be provided within the male connecting assembly 216 and the sensor can read the identifier tag upon the tapered body 328 of male connecting assembly 216 being received within the recess 232 of the female connecting assembly 208. For example, the identifier tag may be a radio frequency identification (RFID) tag. The controller is configured to transmit control signals to enable charging through the first current coupling elements 256 only where the first and second current coupling elements 256, 344 are properly interfaced with one another and the identifier tag indicates that the bicycle is an electric bicycle.

The control system further includes one or more sensors for detecting the presence of one or more conditions that affect whether charging should be carried out. Alternatively, or additional, the control system includes a communication device for receiving data indicating the presence of one or more conditions that affect whether charging should be carried out.

A temperature sensor or a temperature data signal from an external information source can indicate the current temperature in the environment surrounding the bicycle. A temperature sensor may also be included within the battery module of an electric bicycle to measure the temperature of the battery module. The controller may be configured to allow charging of an electric bicycle only when the current temperature exceeds a predetermined temperature threshold.

A sensor or data signal may also indicate a malfunction in the charging current regulator. The controller is configured to stop charging of the electric bicycle in case of a malfunction.

A sensor may detect an imbalance between the power lines and ground. For example, a high-voltage bus may be terminated only at its end-of-line connections by equal high-impedance resistors to the station ground (ex: 12 Vdc negative). These resistors may be used to detect the presence of an imbalance.

According to one example embodiment, the male connecting assembly 216 further includes a communication subsystem that is configured to be in data communication with a communication subsystem of the electronic control system of the female connecting assembly 208 upon the tapered body 328 being received within the recess 232. This communication link can be a bi-directional data link (i.e. male connecting assembly 216 can transmit data to and receive data from the female connecting assembly 200, and vice versa). The communication link can be a radio frequency link and the communication subsystems on each of the male connecting assembly 216 and the female connecting assembly 208 are RF communication subsystems. The communication subsystem may receive sensed data from one or more sensors of the electric bicycle to which the male connecting assembly 216 is mounted. The sensed data may indicate a state of the motor controller, a state of the battery (ex: charge level, battery life, number of charges). This information may be communicated to the electronic control system and controlling of charging of the electric bicycle may be adjusted based on this information (data being transmitted from the male connecting assembly 216 to the female connecting assembly 208). For example, the controller only enables charging of the electric bicycle if the battery charge level is below a given predetermined threshold. The controller may be configured to disable charging if a malfunction on one of the components of the electric bicycle is detected. In some example embodiments, the controller is configured to control the electronic lock of the female connecting assembly 208 and the electronic lock can be unlocked only where the charge level of the electric bicycle exceeds a predetermined charge threshold. Data can also be transmitted from the electronic control system to the electric bicycle (data being transmitted from the female connecting assembly 208 to the male connecting assembly 216). For example, such data can indicate how the electric bicycle is to be operated (ex: torque gain, maximum power, maximum speed). These operational parameters may be defined in personalized assistance profiles for each user of the electric bicycle.

Firmware updates can also be transmitted remotely via the communication subsystems.

Referring back to FIG. 5A, the electronic components of the female connecting assembly 208, including the electronic control system, are housed within the female connector body 220. For example, and as illustrated, the electronic components are implemented on a printed circuit board 424. A power connector 432 is also provided. The power connector 432 can provide the high-voltage circuit for charging the electric bicycle as well as the low-voltage circuit for powering the electronic control system.

Referring back to FIGS. 7B, 7C and 7D, the electronic components 368, including the identification tag of the male connecting assembly 216, can be housed within the inner chamber 320 of the tapered body 328. The signal bus 376 connects the components 368 to various other sensors of the electric bicycle to which the assembly 320 is mounted.

Figure 9:
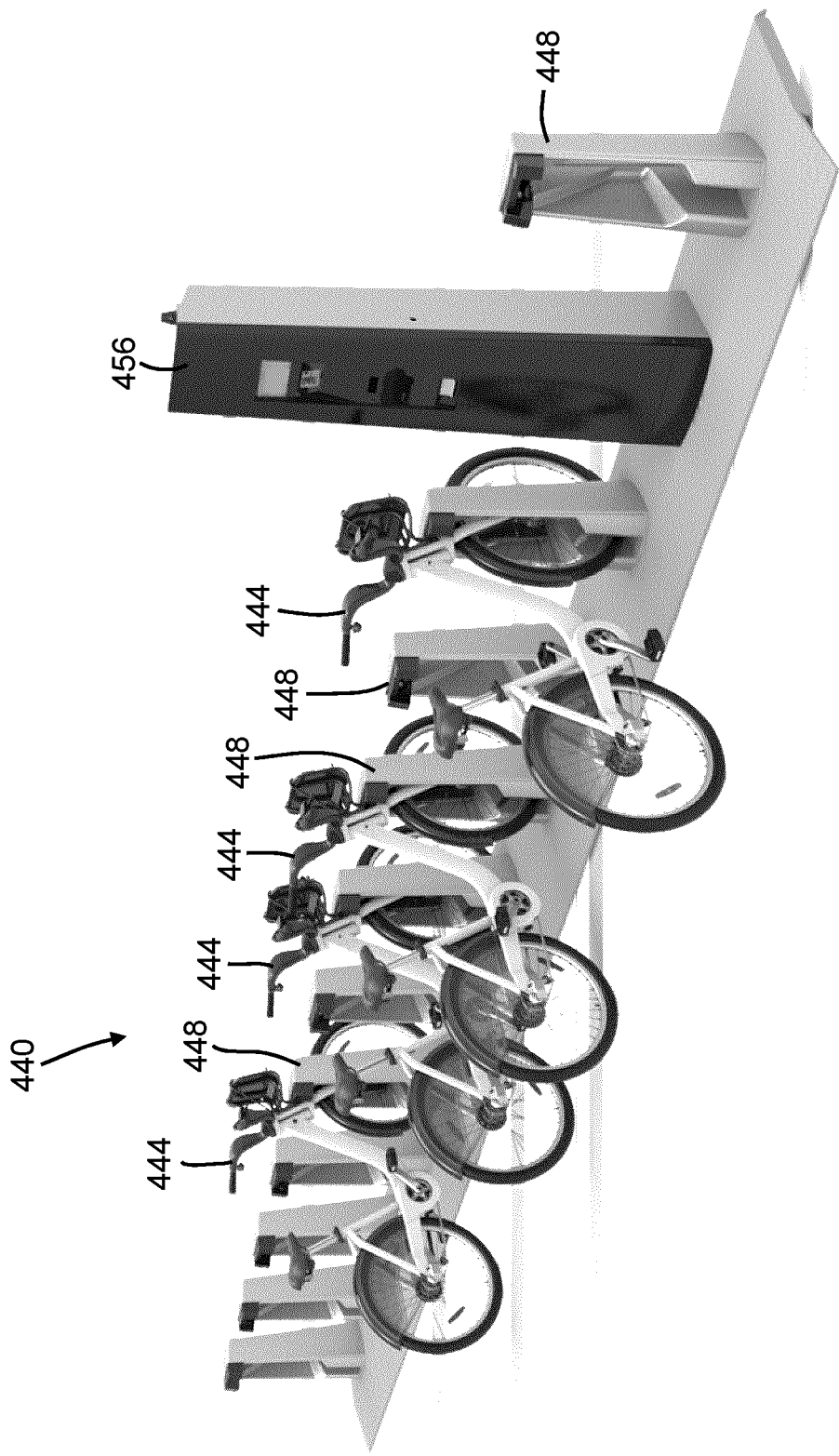
FIG. 9 illustrates a perspective view of an improved bicycle rack system having according to one example embodiment.

Referring now to FIG. 9, therein illustrated is a perspective view of an improved bicycle rack system 440 that is operable for charging one or more electric bicycles. It will be understood that one or more securing systems 200 described herein are installed within the improved bicycle rack system 440 and provide the electrical interface between electric bicycles 444 and the improved bicycle rack 440 system. In the illustrated example, a plurality of bicycles are each secured to a charging-enabled bicycle dock 448. A bicycle can be an electric bicycle 444, and can be charged by a charging-enabled bicycle dock 448. A bicycle can also be a non-electric bicycle 104 and is secured but not charged when docked to a charging-enabled bicycle dock 448.

The improved bicycle rack system 440 includes a power box that includes components for providing the power source that is used to recharge the electric bicycles. The power box may include the connection to mains power (ex: 110V, 240V, 480V), voltage control supplies, one or more higher-voltage converters and backup voltage converters.

The improved bicycle rack system 440 further includes a main kiosk 456. The power box may be housed within the main kiosk 456. The main kiosk 456 may include electronic systems that is operable to monitor and control charging provided to one or more electric bicycles docked to the improved bicycle rack. For example, the electronic systems can be configured to adjust charging amongst a plurality of docked bicycles based on the charge levels of the bicycles and the total load.

The improved bicycle rack system 440 further includes the charging-enabled bicycle docks 448 each being adapted to received one docked bicycle. Cabling for providing current for charging the bicycles, for data communication and for providing power to electronics of the female connecting assembly 208 at one or more of the docks 448 is also included. In one example embodiment, charging-enabled bicycle docks 448 are closest to the power box 440. Additional non-charging enabled bicycle docks can be daisychained onto the outer-most (ex: farthest away from the power box) charging-enabled bicycle docks 448.

In one example embodiment, each docking frames includes a 190 W floating, non-isolated DC-DC converter supplying regulated current to recharge the bicycle battery from the high voltage bus (ex: 58 Vdc bus) The electric bicycle may include battery internal circuits and charging current is not fed to the battery unless a request is made from a battery controller of the circuits.

Figure 10:
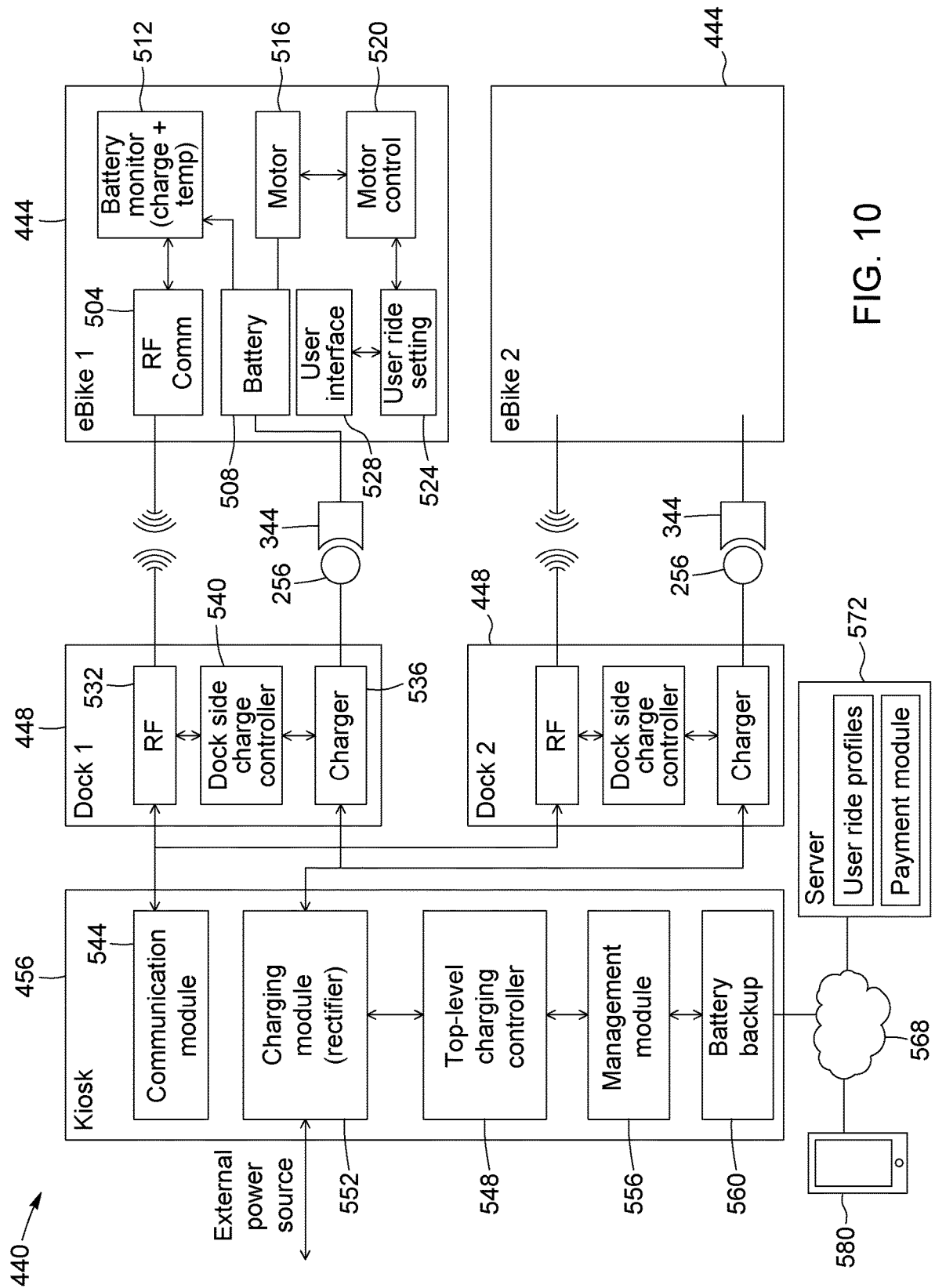
FIG. 10 illustrates a schematic diagram of the operational modules of an improved bicycle rack system according to one example embodiment.

Referring now to FIG. 10, therein illustrated is a schematic diagram of the operational modules of an improved bicycle rack 440 according to one example embodiment. One or more modules can be data processing modules and be implemented as software modules and/or hardware modules, such as within a programmable processing device. Other modules can be mechanical and/or electrical components. The modules are distributed within components of the improved bicycle rack system 440 (kiosk 456, docks 448, and secured electrical bicycles 444).

The electrical bicycle 104 in the illustrated example includes a communication subsystem 504, a battery module 508, a battery monitoring module 512, an electric motor 516, a motor control module 520, a ride settings profile 524, and a user interface module 528.

As described elsewhere herein, the communication subsystem 504, which may be housed in the male connecting assembly 216 of the electric bicycle 444, is operable to form a bi-directional data link with communication subsystem 532 of the female connecting assembly 208 to which it is docked. As also described elsewhere herein, the bi-directional data link may be a radio frequency data link. The communication subsystem 504 is operable to transmit and receive data to and from the communication subsystem 532 of the female connecting assembly 208 of the bicycle dock 448. An identifier of the electric bicycle 444 can also be transmitted by the communication subsystem 504.

The battery module 508 stores electrical energy that is useful for powering the electric motor 516. As illustrated, the battery module 504 is connected to the second current coupling elements 344 to receive electrical power.

The battery monitoring module 512 is operable to monitor one or more operating parameters of the battery module 508. The battery monitoring module 512 may be operable to monitor a charge level of the battery module 508 and a temperature of the battery module 508. Other parameters may include current, voltage, etc. The charge level indicates whether the battery module 508 requires charging (ex: charging is required if the charge level falls below a predetermined threshold). The charge level can also indicate whether the electric bicycle 444 is ready for operation (ex: if the charge level is below a predetermined threshold, the electric bicycle 444 is not to be operated in electric mode). The operating parameters sensed by the battery monitoring module 512 can be transmitted by the communication subsystem 504.

The electric motor 516 receives electrical power from the battery module 508 and converts the power to rotational mechanical power. The mechanical power drives at least one wheel of the electric bicycle 444. A torque sensor may also be provided to measure a torque level outputted by the motor 516.

The motor control module 520 provides control signals for controlling operation of the electric motor 516. For example, the motor control module 520 controls the electric motor 516 so that a desired level of torque is outputted by the electric motor 516. This control can be based on the torque level received from the torque sensor. The motor control module 520 also controls the electric motor 516 so that the electric bicycle is operated in accordance with user ride settings defined in the user ride profile 524.

The user ride profile 524 defines user ride settings corresponding to how the electric bicycle 444 should be operated. In particular, the user ride settings define the amount of assistance that the electric motor 516 should provide when a user is riding the electric bicycle 444. It will be appreciated that the user ride settings can affect the user's experience when riding the electric bicycle 144404. The user ride settings can define a desired torque gain, the maximum power and/or the maximum speed. These can affect the amount of exertion required by the user, the maximum acceleration of the electric bicycle 444 and the maximum speed of the electric bicycle 444. For example, a user using an electric bicycle 444 for the first time may choose a user ride profile 524 that provides a lighter amount of assistance from the motor 516. As the user becomes more comfortable with the assistance from the motor 516, the user can then choose another user ride profile 524 that provides a greater level assistance.

The user ride profile 524 can be received via the communication subsystem 504. For example, a user can use a device external to the electric bicycle to choose a preset user ride profile and/or to define a personalized user ride profile. The user can select or define the user ride profile using at least one of a mobile application, a website, a user interface of the kiosk 456 and the user ride profile is transmitted to the communication subsystem. One or more preset user ride profiles 524 may also be stored within the electric bicycle 444.

The user interface 528 can provide a visual feedback with information regarding operation of the electric bicycle. For example, the user interface 528 can be a series of light (ex: LED) indicators. Alternatively, the user interface 528 can be an electronic display. The user interface 528 can indicate a level of assistance provided by the motor 516 (ex: based on torque sensed by the torque sensor) and/or whether the charge level of the battery module 508 is low. This information can be helpful in guiding the user's use of the electric bicycle 444.

The dock 448, which encompasses a female connecting assembly 208, includes a communication subsystem 532, a charging module 536 and a dock-side charging controller module 540.

As described elsewhere herein, the communication subsystem 532 of the female connecting assembly 208 transmits data to and receives data from the communication subsystem 504 of the male connecting assembly 216 that is secured to the female connecting assembly 208 (when the electric bicycle 444 is docked within the bicycle dock 448). The communication subsystem 532 is also in data communication subsystem 544 of the kiosk 456. For example, the communication subsystem 532 can receive user ride profiles and/or firmware from the communication subsystem 544 of the kiosk 456 and further transmit this data and firmware to the communication subsystem 504 of the docked electric bicycle 444. The communication subsystem 532 of the dock 448 can also receive battery parameters (ex: charge level and/or battery temperature) from the communication subsystem 504 of the electric bicycle 444 and further transmit this to the communication module 544 of the kiosk 456.

The communication subsystem of the dock 448 can also receive one or more condition parameters of the electric bicycle from the communication subsystem 504 of the electric bicycle and further transmit this to the communication module 544 of the kiosk 456. These condition parameters can be further transmitted from the kiosk 456 to a device external to the improved bicycle rack system 440. The external device may be located remotely of the improved bicycle rack system 440. The condition parameters of the electric bicycle can be parameters that indicates an operating condition of the electric bicycle and whether the electric bicycle requires maintenance (ex: diagnostic information about the electric bicycle). For example, the condition parameters can include any one of battery state (charge level, number of charges), mileage since last maintenance, tire pressure, etc. The condition parameters received at the external device may be used to organize dispatching of technicians to various bicycle rack systems 440 to maintain or repair docked electric bicycles.

The charging module 536 encompasses the circuitry that provides electric current to the battery module 508 of the docked electric bicycle to charge the battery module 508. As described elsewhere herein, the first coupling elements 256 of the female connecting assembly 208 interfaces with the second coupling elements 344 of the male connecting assembly 216 when the electric bicycle 444 is docked and the charging current flows over this interface. The charging module 536 receives electric current from the charging module 552 of the kiosk 456.

The dock-side charging controller module 540 is operable to implement local algorithms for controlling the level of electric current and electrical power fed to the battery module 508 to charge it. As described elsewhere herein, the level of electric current provided can be varied according to operating conditions that are present. These may include the amount of available power provided by the available infrastructure (ex: power grid), the number of electric bicycles 544 that are docked within the system 440 and that require charging, and the charge levels of the various electric bicycles 444, etc. Accordingly, the level of electric current provided to a given electric bicycle 444 can be adjusted to improve/optimize use of available power and to improve/optimize distribution of the power amongst the presently docked electric bicycles 444 that require charging. The dock-side charging controller module 540 can be operated in tandem with a top-level charging controller 548 of the kiosk. One or more charging parameters may be received by the communication subsystem 532 from the kiosk 456 and the dock-side charging controller 540 implements control of charging at the dock based on the received charging parameters. The charging controller module 540 can also implement one or more safety controls, such as lowering the level of current or ceasing the current fed to the battery module 508 of the docked electric bicycle when required. This may be to protect against dangerous operating conditions, such as providing too much current when the battery module 508 is overheated or an imbalance is detected.

The kiosk 456 includes a communication module 544, a top-level charging controller 548, a charging module 552, and a management module 556. The kiosk 456 may also include a battery backup module 560.

The communication module 544 is operable to transmit data to and receive data from the communication module 532 of one or more docks of the improved bicycle rack 440, as described elsewhere herein.

The charging module 552 is connectable to an external power source to receive electrical power therefrom. Electrical power drawn from the external power source is further provided to dock-side charging modules 536 to charge the battery modules 508 of electric bicycles 444.

The top-level charging controller module 548 is operable to receive one or more operating parameters within the bicycle rack system 440. These may include parameters of the battery module 508 of each of the electric bicycles 444 currently docked to a dock 448 of the improved bicycle rack system 440. These operating parameters can include, for each battery module 508, a current charge level, the age of the battery, number of charges, a current temperature of the battery, etc. The top-level charging controller module 548 can then control the charging module 552 based on these operating parameters. The top-level charging controller module 548 is configured to adjust the level of electrical power drawn by the charging module 552 from the external power source and provided to the dock-side charging modules 536 based on the one or more operating parameters.

The top-level charging controller module 548 can also detect the number of electrical bicycles 104 currently docked to a dock 120. This information can be detected based on data received from communication modules 532 of the docks 120.

The top-level charging controller module 548 can also detect the available electrical power. It can also track power usage over time.

The charging of each of the battery modules 508 can be carried out so as to ensure safe charging, timely charging, efficient use of available power, limiting power consumption based on operating parameters, adjusting charging as a function of temperature and ensuring longer battery life span of the battery modules.

For any given individual electric bicycle 444, the top-level charging controller module 548 can operate to provide charging to the battery module 508 of that electric bicycle 444 in a way that prolongs the battery life of the battery module 508. For example, the top-level charging controller module 548 can be configured to control the charging module 552 and/or dock-side charging controller 540 to refrain from charging the battery module 508 when the charge level is above a predetermined charge level threshold. This can be carried out to allow more complete depletion and recharge cycles of the battery module 508.

For any given individual electric bicycle 444, the top-level charging controller module 548 can operate to adjust the amount of current provided based on a current temperature of the battery module 508 of the electric bicycle 444. For example, for a high temperature of the battery module 508, the outputted current to that battery module 508 is lowered to ensure safe operating conditions.

Where multiple electric bicycles 444 are currently docked to docks 120 of the improved bicycle rack 440, the top-level charging controller 548 can control the charging module 552 to adjust the level of electrical power drawn from the external power source and outputted by the charging modules 552 (ex: 58V rectifiers).

For example, where a smaller number of electric bicycles 444 are currently docked (other docks are empty or have non-electric bicycles), the level of electrical power outputted to the charging modules 536 of each dock 120 having an electric bicycle 444 can be increased to provide faster charging. Where a larger number of electric bicycles 444 are currently docked, the level of electrical power outputted to the charging modules 536 of each dock 448 can be throttled or decreased. It will be appreciated that this lowers the input consumption by each battery module 508. This limiting of the output current can be carried out to ensure that the total power consumption is within a predetermined power envelope.

Where multiple electric bicycles 444 are currently docked to docks 448, the top-level charging controller 548 can also variably adjust the electrical power outputted to the battery module 508 of each electric bicycle on an individual basis. For example, some electric bicycles (ex: having a high charge level) are not provided with any charging current, other electric bicycles (ex: having a medium charge level) are provided with a low level of charging current, and yet other electric bicycles (ex: having a high charge level) are provided with a high level of charging current. This selective adjustment of output current can be carried out to ensure that the total power consumption is within a predetermined power envelope.

The top-level charging controller 548 can also be configured to adjust the level of electrical power outputted by the charging module 552 based on demand for electric bicycles and/or demand for electricity.

In one operational situation, the output electrical power can be increased (ex: closer to the maximum permitted power envelope) to provide quicker charging during, or approaching, times of day when higher demand for bicycles is expected. For example, these times of the day can be approaching and during rush hour of a work days. The total output current can be decreased when demand is more even, such as on weekends.

In one operational situation, the output electrical power can be decreased (ex: substantially lower than the maximum permitted power envelope) to provide slower charging during times of day when electrical energy is more costly, such as during the early evening. The total output electrical power can be increased (ex: closer to the maximum permitted power envelope) to provide quicker charging during times of day when electrical energy is less costly, such as in the early hours of the morning.

In another operational situation, the level of electrical power outputted can be tracked over time. The outputted electrical power can be adjusted over time based on the total amount of electrical power outputted over a given period of time. For example, the total amount of electrical power outputted can be tracked within a month and the immediate level of electrical power outputted can be lowered when the total exceeds a predetermined threshold. This adjustment of outputted electrical power can be effective in ensuring that the total amount of electrical power outputted for a given interval of time does not exceed a budgeted amount of consumed power.

The components for implementing the charging module 552 and the charging modules 536 of the docks 448 can be chosen to permit a maximum power consumption (ex: 6 kW). It will be appreciated that the top-level charging controller module 548 and the dock-side charging controller modules 540 allows for selectively adjustment of the power consumption. Accordingly, the top-level charging controller module 548 and the dock-side charging controller modules 540 allows the improved bicycle rack 440 to be easily deployed for different available power infrastructures (ex: an external power source that only provides 1 kW power). The top-level charging controller module 548 and the dock-side charging controller modules 540 can be preconfigured at deployment according to the available power infrastructure. This allows the improved bicycle rack 440 to be easily adapted for a variety of operating environments.

According to an exemplary method for managing charging of one or more electric bicycles 444 of the improved bicycle rack system 440, one or more electric bicycles 444 are received within the bicycle docks 448 over time. The level of electrical power received from an external power source and provided to the dock-side charging modules 536 is then selectively adjusted when charging the battery modules 508 of the docked bicycles 444. As described elsewhere herein, adjusting the level electrical power may be carried out based on one or more operating parameters detected within the bicycle rack system 440, as described elsewhere herein.

Continuing with FIG. 10, the kiosk 456 further includes a management module 556 that is operable for managing user accounts. The management module 556 can be in communication over a network, which may be a private network or a wide area network, such as the Internet, with a server 572. The server 572 can store one or more user profiles. In particular, each user profile may include a user's payment profile and a user's ride profile. The payment profile defines the user's methods of payment and payment history. As described elsewhere herein, the user's ride profile defines the user's personalized ride settings. The management module 556 is configured to identify the user and to retrieve the user ride profile from the server 572. The management module 556 is also configured to detect whether a user has provided payment for usage of an electric bicycle. A user can access the management module 556 via a user interface provided on the kiosk 456 to provide user ID, password, payment, etc. The user can also personalize their ride profile and/or select from a plurality of preconfigured ride profiles via the user interface of the kiosk 456. Alternatively, the user can use an electronic device 580, such as a tablet, smartphone, website, etc. to provide payment, to personalize their ride profile and/or to select a preconfigured ride profile. Upon receiving the user ride profile, the management module 556 can send the user ride profile via the communication devices 504, 532 and 544 so that the user ride profile is received at the electric bicycle 444 selected by the user so that this electric bicycle 444 will be operated according to the given user ride profile.

The battery backup 560 stores an amount of backup power. This can be useful to ensure that the improved bicycle rack 544 continues operating when power is not available from the external power source, such as when there is a power outage. In such situations, the improved bicycle rack 544 can still be operable to identify users, accept payment and make bicycles available for usage (locking and unlocking bicycles from docks 120) but recharging of electric bicycles is not provided.

While the above description provides examples of the embodiments, it will be appreciated that some features and/or functions of the described embodiments are susceptible to modification without departing from the spirit and principles of operation of the described embodiments. Accordingly, what has been described above has been intended to be illustrative and non-limiting and it will be understood by persons skilled in the art that other variants and modifications may be made without departing from the scope of the invention as defined in the claims appended hereto.

The invention claimed is:

1. A securing system for securing a vehicle to a docking frame, the securing system comprising:
    a female connecting assembly mountable on the docking frame, the female connecting assembly having:
        a body having inwardly facing opposed sidewalls defining a tapered recess; and
        first current coupling elements each positioned at a respective opposed sidewall of the opposed sidewalls; and
    a male connecting assembly mountable on the vehicle, the male connecting assembly having:

a tapered body having opposed sidewalls converging towards each other and being sized to be received within the tapered recess of the female connecting assembly; and second current coupling elements each positioned at a respective opposed sidewall of the opposed sidewalls, each of the second current coupling elements being positioned to align with and electrically interface with a corresponding one of the first current coupling elements upon the tapered body of the male connecting assembly being received within the tapered recess of the female connecting assembly;

wherein each first current coupling element and corresponding second current coupling element together define a coupling pair comprising a rounded concave element forming part of a surface of the respective opposed sidewall and a rounded convex element shaped to cooperate with the rounded concave element; and wherein the rounded convex element is biased to protrude from the surface of the respective opposed sidewall to mechanically engage with the rounded concave element upon the male connecting assembly being received within the female connecting assembly, the first current coupling elements and second current coupling elements thereby together both mechanically securing the vehicle to the docking frame and providing an electrical coupling between the vehicle and docking frame when the male connecting assembly is received within the female connecting assembly.

2. The system of claim 1, wherein the female connecting assembly further comprises biasing assemblies each positioned at the respective opposed sidewall of the opposed sidewalls, each biasing assembly having one of the first current coupling elements, a biasing element urging the first current coupling element outwardly to protrude from the respective opposed sidewall, and an electrical connector for connecting the first current coupling element to a current source.

3. The securing system of claim 2, wherein each of the first current coupling elements is a ball element; and
wherein each of the second current coupling elements is concave to cooperate with the corresponding ball element.

4. The securing system of claim 3, wherein the biasing element of each biasing assembly of the female connecting assembly is an electrically conductive spring element providing a conductive path between the ball element and the electrical connector.

5. The system of claim 1, wherein each opposed sidewall of the male connecting assembly comprises a receiving recess and a throughhole within the receiving recess providing communication between an interior of the tapered body and an exterior of the tapered body; and
wherein each second current coupling element projects through the throughhole of the respective opposed sidewall of the opposed sidewalls to contact a respective electrical connector.

6. The securing system of claim 5, wherein the male connecting assembly comprises a non-conductive gasket member received within the receiving recess of each opposed sidewall of the male connecting assembly, the non-conductive gasket member having a throughhole aligned with the throughhole of the receiving recess; and
wherein each second current coupling element is positioned within the non-conductive gasket member whereby a front portion of the second current coupling element is surrounded by the non-conductive gasket member.

7. The system of claim 1, wherein the second current coupling elements selectively receive electric current from the first current coupling elements when interfaced therewith.

8. The securing system of claim 1, wherein the first current coupling elements are electrically conductive;
wherein the second current coupling elements are electrically conductive; and
wherein the second current coupling elements receive current from the first current coupling elements from physical contact therebetween.

9. The securing system of claim 1, wherein the first current coupling elements comprise inductive coupling elements;
wherein the second current coupling elements comprise inductive coupling elements; and
wherein the second current coupling elements receive current from the first current coupling elements from inductive coupling therebetween.

10. The securing system of claim 1, wherein each of the first current coupling elements and each of the second current coupling elements are sized and shaped to cooperatively engage one another when the male connecting assembly is received within the tapered recess of the female connecting assembly.

11. The securing system of claim 1, wherein each of the second current coupling elements is electrically connected to a battery for storing electrical energy powering the vehicle; and
wherein current received at the second current coupling elements from the first current coupling elements when interfaced is used to recharge the battery.

12. The securing system of claim 1, wherein the male connecting assembly further comprises a machine-readable identification tag indicating a type of vehicle to which the male connecting assembly is mounted; and
wherein the female connecting assembly comprises an electronic control subsystem configured to read the identification tag when the tapered body of the male connecting assembly is received within the tapered recess of the female connecting assembly and selectively enable providing of charging current to the male connecting assembly based on the type of the vehicle.

13. The securing system of claim 1, wherein the electric vehicle is a bicycle.

14. A rack system comprising:
at least one electric vehicle comprising:
a battery module for storing electrical energy;
and a male connecting assembly mounted to the electric vehicle; and
at least one vehicle dock having a female connecting assembly mounted thereto and being configured to receive an electric vehicle of the at least one electric vehicle docked therewith and having a dock-side charging module operable to selectively provide an electric current to the electric vehicle docked therewith via mating of the male connecting assembly to the female connecting assembly;
wherein the female connecting assembly comprises:
a body having inwardly facing opposed sidewalls defining a tapered recess;
first current coupling elements each positioned at a respective opposed sidewall of the opposed sidewalls;

wherein the male connecting assembly comprises:
a tapered body having opposed sidewalls converging towards each other and being sized to be received within the tapered recess of the female connecting assembly; and
second current coupling elements each positioned at a respective opposed sidewall of the opposed sidewalls, each of the second current coupling elements being positioned to align with and electrically interface with a corresponding one of the first current coupling elements upon the tapered body of the male connecting assembly being received within the tapered recess of the female connecting assembly; and
wherein each first current coupling element and corresponding second current coupling element together define a coupling pair comprising a rounded concave element forming part of a surface of the respective opposed sidewall and a rounded convex element shaped to cooperate with the rounded concave element;
wherein the rounded convex element is biased to protrude from the surface of the respective opposed sidewall to mechanically engage with the rounded concave element upon the male connecting assembly being received within the female connecting assembly, the first current coupling elements and second current coupling elements thereby together both mechanically securing the vehicle to the vehicle dock and providing an electrical coupling between the electric vehicle and the vehicle dock when the male connecting assembly is received within the female connecting assembly.

15. The rack system of claim 14, comprising a charging controller configured for adjusting a level of electrical power provided to the dock-side charging module from an external source of power, wherein the charging controller is configured to adjust the level of electrical power drawn from the external source of power and provided to the dock-side charging module based on at least one operating parameter within the rack system.

16. The rack system of claim 15, wherein the at least one operating parameter comprises a charge level of the battery module of the electric vehicle docked to the vehicle dock; and
wherein the charging controller is configured to adjust the level of electrical power drawn from the external source of power and provided to the dock-side charging module based on charge level of the electric vehicle docked thereto.

17. The rack system of claim 15, comprising a plurality of vehicle docks and a plurality of electric vehicles docked with the plurality of vehicle docks, wherein the at least one operating parameter comprises a charge level of the battery modules of the plurality of electric vehicles docked to a subset of the plurality of vehicle docks;
wherein the charging controller is configured to adjust the level of electrical power drawn from the external source of power and provided to the dock-side charging modules of each of the subset of the plurality of vehicle docks based on the charge level of the battery modules; and
wherein the electrical power provided to the dock-side charging module of a first of the subset of the plurality of vehicle docks is different from electrical power provided to the dock-side charging module of a second of the subset of the plurality of vehicle docks.

18. The rack system of claim 15, comprising a plurality of vehicle docks and a plurality of electric vehicles docked with the plurality of vehicle docks, wherein the at least one operating parameter comprises a number of vehicle docks having electric vehicles docked thereto; and
wherein the charging controller is configured to adjust the level of electrical power drawn from the external source of power and provided to the dock-side charging modules based on the number of vehicle docks having electric vehicles docked thereto.

19. The rack system of claim 15, comprising a plurality of vehicle docks and a plurality of electric vehicles docked with the plurality of vehicle docks, wherein the at least one operating parameter comprises an expected usage demand for the plurality of electric vehicles; and
wherein the charging controller is configured to adjust the level of electrical power drawn from the external source of power and provided to the dock-side charging modules of the plurality of docks based on the expected usage demand for the plurality of electric vehicles.

20. The rack system of claim 15, wherein the at least one operating parameter comprises a cost of electrical power from the external source of power; and
wherein the charging controller is configured to adjust the level of electrical power drawn from the external source of power and provided to the dock-side charging module based on the cost of electrical power from the external source of power.

21. The rack system of claim 15, wherein the at least one operating parameter comprises the total amount of electrical power consumed from the external source of power being tracked over an interval of time; and
wherein the charging controller is configured to adjust the level of electrical power drawn from the external source of power and provided to the dock-side charging module based on the total amount of electrical power consumed from the external source of power being tracked over an interval of time.

22. The rack system of claim 15, wherein the dock-side charging module is configured to have a given level of maximum power consumption and wherein the external source of power provides a level of maximum amount of available power being less than the maximum power consumption; and
wherein the charging controller is configured to adjust the level of electrical power drawn from the external source of power based on the level of maximum amount of available power from the external source of power.

23. The rack system of claim 15, wherein the level of electric current provided by the dock-side charging module of the vehicle dock is operable to be adjusted based on at least one operating parameter of the battery module of the electric vehicle docked therewith; and
wherein the at least one operating parameter of the battery module comprises one or more of a temperature of the battery module, a voltage of the battery module, a current of the battery module and a charge level of the battery module.

24. A securing system for securing a vehicle to a docking frame, the securing system comprising:
a female connecting assembly mountable on the docking frame, the female connecting assembly having:
a body having inwardly facing opposed sidewalls defining a tapered recess; and
first current coupling elements each positioned at a respective opposed sidewall of the opposed sidewalls; and a male connecting assembly mountable on the vehicle, the male connecting assembly having:
- a tapered body having opposed sidewalls converging towards each other and being sized to be received within the tapered recess of the female connecting assembly; and
- second current coupling elements each being received in a respective opposed sidewall of the opposed sidewalls, each of the second current coupling elements being positioned to electrically interface with a corresponding first current coupling element upon the tapered body of the male connecting assembly being received within the tapered recess of the female connecting assembly;

wherein the female connecting assembly further comprises biasing assemblies positioned in a respective one of the opposed sidewalls, each biasing assembly having one of the first current coupling elements, a biasing element urging the first current coupling element outwardly to protrude from the sidewall, and an electrical connector for connecting the first current coupling element to a current source;

wherein each of the first current coupling elements is a ball element;

wherein each of the second current coupling elements is concave to cooperate with the corresponding ball element; and wherein the biasing element of each biasing assembly of the female connecting assembly is an electrically conductive spring element providing a conductive path between the ball element and the electrical connector.

* * * * *